United States Patent [19]
Picazo, Jr. et al.

[11] Patent Number: 5,805,816
[45] Date of Patent: Sep. 8, 1998

[54] NETWORK PACKET SWITCH USING SHARED MEMORY FOR REPEATING AND BRIDGING PACKETS AT MEDIA RATE

[75] Inventors: Jose J. Picazo, Jr., San Jose; Paul Kakul Lee, Union City; Robert P. Zager, San Jose, all of Calif.

[73] Assignee: Compaq Computer Corp., Houston, Tex.

[21] Appl. No.: 788,429

[22] Filed: Jan. 28, 1997

Related U.S. Application Data

[62] Division of Ser. No. 694,491, Aug. 7, 1996, which is a continuation of Ser. No. 498,116, Jul. 5, 1995, which is a continuation-in-part of Ser. No. 881,931, May 12, 1992, Pat. No. 5,432,907.

[51] Int. Cl.$^6$ ..................................................... G06F 13/00
[52] U.S. Cl. ............................... 395/200.53; 395/200.64; 395/200.79; 395/200.8; 370/401; 370/230; 370/315; 370/351
[58] Field of Search ................... 395/200.53, 200.64, 395/200.79, 200.8; 370/230, 315, 351, 401

[56] References Cited

U.S. PATENT DOCUMENTS

| | | | |
|---|---|---|---|
| 4,641,307 | 2/1987 | Russell | 370/445 |
| 4,715,030 | 12/1987 | Koch et al. | 370/85 |
| 5,133,062 | 7/1992 | Joshi et al. | 395/500 |
| 5,210,749 | 5/1993 | Firoozmand | 370/463 |
| 5,264,742 | 11/1993 | Sourgen | 307/465 |
| 5,274,631 | 12/1993 | Bhardwaj | 370/401 |
| 5,299,313 | 3/1994 | Petersen et al. | 395/200.64 |
| 5,303,302 | 4/1994 | Burrows | 380/49 |
| 5,339,313 | 8/1994 | Ben-Michael et al. | 370/230 |
| 5,361,372 | 11/1994 | Rege et al. | 395/200.64 |
| 5,434,863 | 7/1995 | Onishi et al. | 395/200.64 |
| 5,440,546 | 8/1995 | Bianchini, Jr. et al. | 370/60 |
| 5,440,690 | 8/1995 | Rage et al. | 395/200.8 |
| 5,457,681 | 10/1995 | Gaddis et al. | 370/56 |
| 5,477,547 | 12/1995 | Sugiyama | 370/85 |
| 5,521,913 | 5/1996 | Gridley | 370/58.2 |
| 5,560,029 | 9/1996 | Papadopoulos et al. | 395/800.25 |

*Primary Examiner*—Christopher B. Shin
*Attorney, Agent, or Firm*—Jenkens & Gilchrist

[57] ABSTRACT

A hub circuit with an integrated bridge circuit carried out in software including a switch for bypassing the bridge process such that the two bridged networks effectively become one network. An in-band management process in software is disclosed which receives and executes network management commands received as data packets from the LANs coupled to the integrated hub/bridge. Also, hardware and software to implement an isolate mode where data packets which would ordinarily be transferred by the bridge process are not transferred except in-band management packets are transferred to the in-band management process regardless of which network from which they arrived. Also disclosed, a packet switching machine having shared high-speed memory with multiple ports, one port coupled to a plurality of LAN controller chips coupled to individual LAN segments and an Ethernet microprocessor that sets up and manages a receive buffer for storing received packets and transferring pointers thereto to a main processor. The main processor is coupled to another port of the memory and analyzes received packets for bridging to other LAN segments or forwarding to an SNMP agent. The main microprocessor and the Ethernet processor coordinate to manage the utilization of storage locations in the shared memory. Another port is coupled to an uplink interface to higher speed backbone media such as FDDI, ATM etc. Speeds up to media rate are achieved by only moving pointers to packets around in memory as opposed to the data of the packets itself. A double password security feature is also implemented in some embodiments to prevent accidental or intentional tampering with system configuration settings.

6 Claims, 13 Drawing Sheets

NETWORK PACKET SWITCH USING SHARED MEMORY FOR REPEATING AND BRIDGING PACKETS AT MEDIA RATE

This is a divisional application of U.S. patent application Ser. No. 08/694,491, filed Aug. 7, 1996, which is a continuation of U.S. patent application Ser. No. 08/498,116, filed Jul. 5, 1995, which is a continuation-in-part of U.S. patent application Ser. No. 07/881,931, filed May 12, 1992, now Pat. No. 5,432,907.

BACKGROUND OF THE INVENTION

This is a continuation-in-part of a U.S. patent application entitled, NETWORK HUB WITH INTEGRATED BRIDGE, Ser. No. 07/881,931, filed May 12, 1992, (now allowed). The invention pertains to the field of networks for communications between computers, and, more specifically, to improvements in hubs for such networks.

Networks serve the purpose of connecting many different computers or terminals to each other, host computers, printers, file servers etc. so that expensive computing assets, programs, files and other data may be shared among many users. Communication protocols and standards for networks developed quickly to standardize the way in which data packets were sent across the data exchange media of the network. Several protocols have developed for networks including Ethernet™, Token Ring™, FOIRL and FDDI, the latter two being adapted for fiber optic physical media carrying the signals.

The physical media first used on Ethernet were thick coaxial cables, and a standard called 10Base5 was developed for assuring multi-vendor compatibility between components in thick coax, mix and match networks where network components from different vendors were used. These thick coax lines were bulky, expensive and hard to work with. Later, thinner coax Ethernet was developed, and, as an alternative to coax, unshielded twisted pair wires were used for the physical media. A vendor compatibility standard called 10BaseT developed for twisted pair media.

Networks have their own hardware and software to interface with the physical media that carry the signals, and the network software must interface with the operating system software. Computers communicate with each other using a set of rules called a protocol. A group of protocols, all related to the same model are called a protocol suite. To encourage open systems, a common model called OSI was developed by the International Standards Organization. OSI engendered a protocol suite which allows computers of all sizes and capabilities the world over to communicate using a common set of rules.

The OSI model has seven layers of software, each of which makes different functionality available to computers communicating using this model. Each layer in the model deals with specific computer-communication functions.

The Physical Layer is the lowest layer and specifies the rules for transmission of signals across the physical media. Hubs, also known as repeaters, have multiple connections to this physical media called ports. The purpose of a hub is to receive data packets from one port and repeat these packets, i.e., retransmit them on every other port connected to the hub according to whatever protocol, e.g., Ethernet, etc., which is in use.

The Data Link layer deals with transmission of data between devices on the same network. In addition to describing how a device accesses the physical media, this layer also provides some measure of error detection and control. Local Area Network (LAN) technologies such as Ethernet, Token Ring and FDDI operate at this layer. Data link addresses are implemented at this layer, and provide each device connected to the network a unique identifier by which packets may be sent to it. Bridges, which are devices which aid in forwarding data packets from one network segment or one network to another, operate at the Data Link layer.

The Network Layer deals with transfer of data between devices on different networks. The Network Layer adds the notion of network addresses which are specific identifiers for each intermediate network between a data source and a destination. Routers, which are devices which assist in transferring data packets from one network to another, operate at the Network Layer.

The remaining layers, called the higher layers, are the Transport Layer, Session Layer, Presentation Layer and Application Layer. These layers deal with communication between message source and message destination. The transport layer manages the transfer of data from a source program to a destination program. Process addresses, which identify specific "processes", i.e., computer programs, are implemented at this layer. Gateways operate at these higher OSI layers.

Within the OSI model, the user presents data through application programs to the highest layer. This data is then passed downward through the hierarchy of layers with each layer adding addressing and/or control information. When the data reaches the physical layer, it is sent to a device.

Conversely, received data is passed up through the layers with each layer stripping address or control information.

One way to think of a protocol is a common language by which computers may communicate, but a more accurate way is as a set of rules by which data is communicated between identical OSI layers.

There are other communication protocols beside the OSI Model. These include TCP/IP, XNS, IPX, AppleTalk, DECnet and SNA. Each of these protocols has its own layer model. For example, TCP/IP collapses network functionality into only 4 layers, while AppleTalk has 6 layers.

All network media have a limitation on the maximum volume of traffic that may be carried based upon the bandwidth imposed by the physical characteristics of the media. Ethernet bandwidth is 10 Megabits/second. This acts a limit on the traffic volume and can limit the number of computers, which may be connected to a single "segment" of a network. A segment is section of a network connected to a group of machines which may communicate with each other via repeater operations without having to traverse a bridge or router. Bridges and routers are useful in that they allow connections of multiple segments such that more computers may communicate with each other than would otherwise be possible given the limited bandwidth of the media.

Each bridge and router requires certain other peripheral circuitry to support it such as LAN controllers, a CPU, a power supply, a network management process, memory to store bridge source and destination address tables and various other things like status registers etc. Likewise, repeaters require many support circuits many of which are the same support circuits needed by bridges and routers. Further, bridges, routers and repeaters or hubs require-initialization to set them up for operations, and they require initial installation labor to set them up properly to operate in a particular network configuration. In addition, each type machine is subject to network management considerations, assuming an intelligent hub. An intelligent hub is one which collects statistics about traffic flow through its ports, can electronically turn ports on and off and which provides error correction and detection services. Intelligent bridges, routers and hubs supply status information upon request from network management processes and can respond to network management commands, such as shut off a particular port.

In the prior art, bridges and routers were separate circuits from hubs and this created needless duplication of many peripheral circuits which were common between hubs and bridges and which could be shared. This needless duplication cost more and provided more points of failure. For example, if the bridge power supply failed or the CPU crashed, all machines on the two network segments on either side of the bridge would be cut off from each other.

Typically, a bridge is connected to a hub by a separate local area network segment which itself requires two port interface circuits such as LAN controllers and AUI's (generic network interfaces) with appropriate port drivers adapted for the specific media used for the bridge-hub LAN segment. This bridge-hub LAN segment represents an additional expense, requires management and provides additional points of failure which could disable the network. An intelligent hub coupled to a bridge or router by a separate LAN segment then requires three different device addresses for management message traffic, and creates more possibility for a network failure in multiplying the number of points of possible failure.

Another drawback of separate bridge/router and hub circuits is that bridge/routers do not usually include a mode where the bridge/routing function can be bypassed. The ability to bypass the bridge/routing function provides flexibility in network growth as small networks do not need bridging functions until the maximum network traffic volume starts to exceed the available network bandwidth. The ability to selectively bypass the bridge/routing function gives a network designer the ability to design a small network which has a built in capacity to grow larger without adding new components and improves the ability to troubleshoot the network.

Integrated hubs and bridges existed as option cards for concentrator chassis at the time this patent application was filed. One example of such a device is the Penril 2530 concentrator card with full performance bridging although it is not currently known whether this device qualifies as prior art because the copyright date of the literature on this device is dated the same month as the filing date of the parent of this patent application. The Penril Module 2530 10baseT concentration and bridging card for the Penril 2500 series concentrator combines a hub and bridge which operates at all times on the same printed circuit board. The design of the Penril 2500 concentrators were for large networks. The 2530 card slides into a card slot on the 2500 series concentrator which can also service a plurality of such cards. The concentrator frame is believed to contain certain shared features such as power supply etc. and has a local, internal LAN segment that couples all the repeater/bridge cards together so that they can send data back and forth between them. The repeater on each card can be coupled to up to 25 machines on the network segment connected to that card and the integrated bridge continuously bridges the network segment coupled to a particular card to the internal LAN segment such that a machine coupled to a LAN segment coupled to card 1 can send a packet to a machine coupled to a LAN segment coupled to card 2 via the bridge on card 1, the internal LAN segment of the concentrator, the bridge on card 2 and the repeater on card 2. No distributed management functionality is integrated on either card 1 or 2. That management functionality is placed on a third card which resides on a different card slot. If the management card broke, the repeaters and bridges in cards 1 and 2 could not be controlled. Likewise, if the internal LAN broke, user 1 could not send data to user 2 or vice versa.

A concentrator structures like the Penril 2500 series is designed for large networks since to connect two external network segments, two cards are needed each of which can service up to 25 user machines. If the network has only 27 users, such a concentrator represents too big and complex of a structure to be affordable and justifiable for such an application.

Another problem with concentrators such as the Penril 2500 series is their lack of "stackability". The problem is this. Suppose a particular building had 3 users on the ground floor and a group of 20 heavy users on the 4th floor or otherwise spaced away from the 3 users on the ground floor by a distance which is just under the maximum 10BaseT cable run permitted by the applicable Ethernet specification. The use of a concentrator requires that every one of the group of 20 users has his own twisted pair running from his machine back to the concentrator. The same is true for thick and thin coaxial cable installations. Such a configuration can be prohibitively expensive because a great deal of wire or coax must be used and the expense of installing all that wiring through the walls and ceilings can be large. Now suppose that the distance to the group of 20 from the concentrator is larger than the maximum allowable cable run. In such a case, the complex wiring cannot be used, and if those users must be able to share resources with the 3 users on the first floor, another concentrator must be purchased. Concentrators like the Penril are not inexpensive. Typical costs today are in the neighborhood of $30,000 for the concentrator frame and about $6000 for each card.

A similar problem arises in large networks in big companies who may, for example, have a branch office in another state with only 6 users. If those users must share data or resources connected to the network at the parent company, they must be on the same network as the users at the parent company. With concentrator technology, the 6 users in the branch office must be connected to the concentrator at the parent company by a wide area network (WAN) connection. The Penril concentrator 2500 series has a card module (the 2540) which implements a WAN interface, but the 6 users in the branch office must also have a concentrator to plug their WAN interface card into. Therefore, the expense of having the tiny 6 user network segment remotely located is greater than it needs to be.

Thus, a need has arisen for an apparatus which can perform the functionality of bridges or routers and hubs without the aforementioned deficiencies, and which can overcome the aforementioned difficulties with concentrator technology in smaller networks or large network will small satellite networks.

SUMMARY OF THE INVENTION

According to a broad teaching of the invention, there is disclosed herein, inter alia, a packet switching machine having shared high-speed memory with multiple ports. One port is coupled to a plurality of LAN controller chips each of which is coupled to its own media access unit and an individual LAN segment. The port coupled to the LAN controllers is also coupled to an Ethernet processor that serves to set up, manage and monitor a receive buffer having enough space to store packets received by all the LAN controller chips. The Ethernet process also sets up and manages a transmit buffer for each LAN controller chip and sets up and monitors a descriptor ring which stores status data maintained by the LAN controller chips and pointers to the transmit and receive buffer portions of the shared memory.

When a LAN controller receives a packet, the packet is stored in the receive buffer in shared memory, and a pointer to that packet is written into the receive portion of the portion of the descriptor ring devoted to that LAN controller. The LAN controller sets a status bit in the receive portion of the portion of the descriptor ring that is devoted to that LAN controller when packet reception starts indicating that a packet is being received. After packet reception is complete and error detection has been done and the packet is deemed to be correct, the LAN controller sets another bit in the receive portion of the portion of the descriptor ring that is devoted to that LAN controller indicating that the packet has been correctly received.

The Ethernet process monitors status bits set in the descriptor ring by the LAN controller chips that indicate when a packet has been successfully received, and, when this event occurs, reads the pointer to the packet from the descriptor ring and transfers the pointer to a queue which is monitored by a main processor coupled to another port of the shared memory. The main processor is coupled to another port of the memory and monitors its queue for the presence of pointers. When a pointer to a received packet is found, the main processor accesses the packet and determines from the packet's address data what to do with the packet. If the packet is addressed to a machine coupled to the media segment of a different LAN controller than the LAN controller that received the packet, the main processor writes a pointer to the packet into the transmit buffer of the LAN controller coupled to the media segment on which the packet is to be transmitted. If the packet is a management packet, a pointer to the packet is written into a management queue which is monitored by an SNMP agent so as to forward the packet to the SNMP agent for processing. The SNMP agent and the packet switching tasks are time division multiplexed with a console process by an operating system kernel.

The main microprocessor and the Ethernet processor coordinate to manage the utilization of storage locations in the shared memory. When the main microprocessor writes a pointer to a packet into one or more transmit buffers, it also accesses a reference count in a predetermined field in the packet stored in the receive buffer and writes a number therein indicating the number of LAN controllers that are scheduled to transmit the packet. The LAN controllers also write status bits into transmit portions of the descriptor record in the portion of the descriptor ring devoted to that LAN controller. The Ethernet processor monitors the transmit portions of the descriptor ring. When the Ethernet processor determines that a status bit for a particular LAN controller indicates that the LAN controller has successfully transmitted a packet, the Ethernet processor accesses the reference count field in the packet and decrements the reference count. When the reference count reaches zero, the Ethernet processor writes a pointer to the storage location in which that packet is stored in the receive buffer into a Free Queue indicating that the storage locations currently occupied by the packet are free to be used to store other incoming packets.

Another port of the shared memory is coupled to an uplink interface to higher speed backbone media such as FDDI, ATM etc. The main microprocessor can forward packets to these interfaces by writing pointers into transmit buffers dedicated to these interfaces in the shared memory, and received packets are written into the receive buffer as if they were received by a LAN controller.

In some embodiments, another port of the shared memory is coupled to an expansion interface having another microprocessor which serves to load share with the Ethernet processor and the main processor to achiever higher speed operation.

Speeds up to media rate are achieved by only moving pointers to packets around in memory as opposed to the data of the packets itself.

A double password security feature is also implemented in some embodiments to prevent accidental or intentional tampering with system configuration settings.

DETAILED DESCRIPTION OF THE PREFERRED EMBODIMENT

Figure 1:
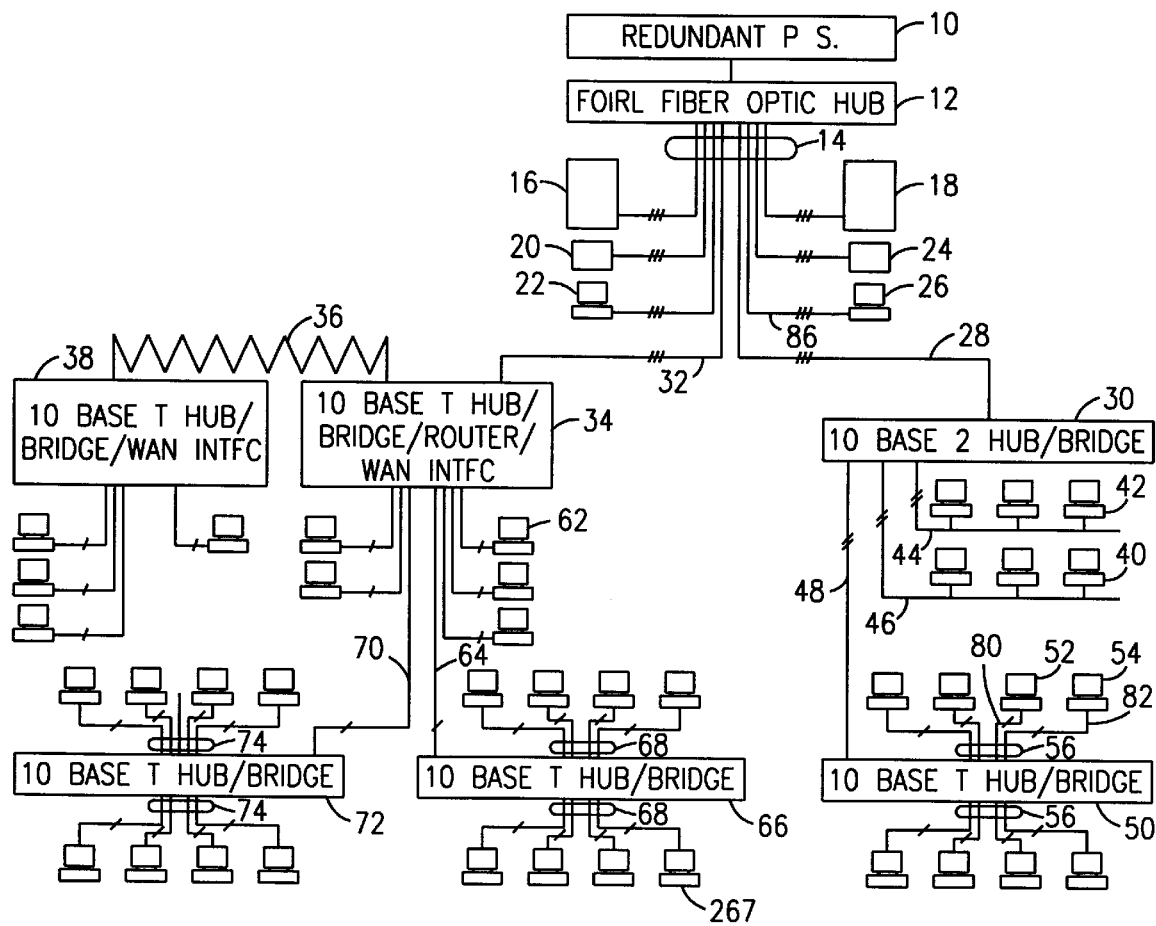
FIG. 1 is a block diagram of a typical network environment in which the teachings of the invention find utility.

Referring to FIG. 1 there is shown a typical network installation in which the teachings of the invention find use. A redundant power supply 10 supplies a fiber optic hub 12 which has a plurality of fiber optic ports indicated generally at 14. Each of these ports is connected to a fiber optic physical data transmission media via a port driver circuit not shown. Each of the fiber optic media is indicated by a line with three slash marks through it. These media are coupled to mainframe computers 16 and 18, laser printer 20 and three personal computers 22, 24 and 26. Data transmitted to the fiber optic hub 12 by any of the computers is automatically repeated by repeater circuitry in the hub on all the other ports using the FOIRL Ethernet standard.

The fiber optic hub 12 is connected via a backbone port connection 28 to a 10Base2 hub with integrated bridge 30. The fiber optic hub also has another port serving as a backbone connection 32 to a 10BaseT hub 34 with integrated high performance bridge/router and wide area network (WAN) interface 36. The wide area network interface can span great distances. In the example shown, the wide area network interface 36 couples the 10BaseT hub 34 to another 10BaseT hub 38 with an integrated high performance bridge and wide area network interface. The hub with integrated bridge represents a significant advantage in that the presence of bridges and routers in complex, high volume networks provides segmentation of the network so as to maximize use of the media by allowing maximum traffic volume, i.e., volume at media rate, e.g., 10 megabits/second for Ethernet, on more segments of the network without violating the maximum Ethernet specification limit of 4 repeaters between devices. Since bridges and repeaters require many of the same support circuits, it is advantageous to combine a bridge and a hub into the same circuit so as to share these support circuits. Such a combined hub/bridge reduces the cost, complexity and points of failure. Such a combined circuit also eliminates the bridge to hub LAN segment where the bridge and hub are separate. This also eliminates the IP address of this segment and all management burden thereof.

Coupling of portions of a LAN by a bridge also allows the segments on opposite sides of the bridge to use different communication protocols.

Also, in some embodiments, the bridge can be a router, and any known routing or bridging process is within the teachings of the invention.

Another advantage of a combined hub and bridge is the stackability of the architecture as compared to concentrators like those manufactured by Penril. When a user is out of card slots in a concentrator, that user will have to buy an entirely new concentrator (concentrators are very expensive) even if there is only one small group of users who cannot fit into the the repeater cards on the first concentrator. Another disadvantage of concentrators with bridge cards, repeater cards and management cards, is that the management is not integrated. If the management card fails, the bridge and repeater cards are not manageable.

The 10Base2 hub 30 is connected to a number of computers of which computers 40 and 42 are typical. These connections are via coaxial line segments 44 and 46. Coaxial connections are shown in FIG. 1 by lines with two slash marks through them. The 10Base2 hub 30 is also connected via a coaxial backbone connection 48 to a 10BaseT hub with integrated bridge 50.

The 10BaseT hub 50 is connected via a plurality of repeater ports 56 to a plurality of computers of which computers 52 and 54 are typical. Any data packet entering the hub 50 from any one of the ports is automatically repeated on all the other repeater ports 56. The same type of repeating operation is carried out automatically by all of hubs 12, 30, 34, 38, 66 and 72.

A 10BaseT hub uses a physical layer communication protocol which is appropriate for a twisted pair of physical media. Twisted pair connections are shown in FIG. 1 by lines with single slashes through them. A 10Base2 hub repeats data packets on its ports using a physical layer protocol appropriate to coaxial cable.

The 10BaseT hub 34 has a plurality of repeater ports connected to a plurality of computers of which device 62 is typical. Hub 34 also has a twisted pair port connection 64 to another 10BaseT hub 66 which has an integrated bridge. Connection 64 is a backbone connection for hub 66. Hub 66 is connected to a plurality of computers of which computer 67 is typical via repeater ports 68.

Likewise, hub 34 is connected via a twisted pair port connection 70 to the backbone port of another 10BaseT hub with integrated bridge 72. The hub/bridge 72 is connected to a plurality of computers via repeater ports 74.

As an example of how the integrated hub bridge circuits in FIG. 1 work, consider the following hypothetical data exchange transactions. Suppose that computer 52 wishes to send a data packet to computer 54. In this example, the data packet would enter the 10BaseT hub/bridge 50 via twisted pair line 80 and would be automatically repeated on all the repeater ports 56 including twisted pair line 82. Computer 54 would receive the packet as would all the other computers connected to hub/bridge 50. However, the packet would have a destination address indicating device 54 was the intended recipient such that other computers connected to the hub/bridge 50 would discard the packet.

In the preceding example, the bridge function in hub/bridge 50 would examine the destination address of the packet arriving via twisted pair 80 and check a forwarding table of network addresses which contains entries for various network addresses indicating whether those addresses are on network 1 or network 2. In the bridge mode of operation for hub/bridge 50, all of the repeater ports 56 are considered to be network 1 and the backbone connection 48 is considered to be network 2. The bridging function, in the preferred embodiment, is a learning bridge which builds the forwarding table as data packets arrive at the bridge from each source address. The bridging function knows which network a packet came from, and will make an entry in its table associating each source address with the network from which it came. Assuming that computer 54 had already sent a packet somewhere else, the bridging function would know that computer 54 was connected to network 1 and therefore would not forward the packet received from computer 52 to the network 2 via backbone connection 48. However, in the situation where computer 54 had not previously sent a packet, the bridging function in hub/bridge 50 would assume that computer 54 was connected to network 2, and would forward the packet to network 2 via backbone connection 48. However, since the packet would be automatically repeated on all repeater ports 56 anyway, computer 54 would still receive the packet via its repeater port even though the packet was also forwarded to network 2. Since computer 54 would send an acknowledgment message acknowledging receipt of the packet, the bridge function in hub/bridge 50 would then make an entry in its table indicating that computer 54 was coupled to network 1. Thereafter, further packets destined for computer 54 would not be forwarded by the bridge in hub/bridge 50 on the backbone 48.

Now suppose computer 52 wishes to send a packet to computer 42. In this case, the bridge function in hub/bridge 50 would not find an entry for computer 42 and would forward the packet received from network 1 via twisted pair 80 out on the coaxial backbone connection 48.

The backbone connection 48 for hub/bridge 50 is connected to a repeater port of 10Base2 hub/bridge 30. Therefore the packet arriving on coaxial line 48 is automatically repeated on coaxial lines 44 and 46, and would therefore arrive at computer 42.

To change the hypothetical slightly, suppose computer 52 wanted to send a packet to computer 26 connected to fiber optic hub 12. In this case, the bridging functions in hub/bridge 30 would read the destination address and may or may not find an entry for computer 26. In either eventuality, the bridge 30 would forward the packet received on coaxial line 48 out on fiber optic backbone connection 28. This backbone connection 28 is connected to one of the repeater ports of the fiber optic hub 12 and therefore would be repeated on all other repeater ports 14 thereof. In this manner the packet would be transmitted out on the repeater port connected to fiber optic media 86 and would arrive computer 26.

One of the advantages of integration of the hubs and bridges in the sample network of FIG. 1 is that it substantially reduces the cost of the network. This is, in part, because the hub/bridge integration eliminates much circuitry needed to couple each hub to a bridge with the associated LAN controllers and transceivers needed to do this. Network management traffic is also reduced because there are fewer network addresses of machines which must be addressed by network manager traffic. Typically a network manager will be coupled to one of the hub/bridges by a terminal and will address management commands to any of the network implementing circuits on the network. These commands will be forwarded as data packets to the proper hub/bridge etc. like other data packets, but will be taken off the network by the machine to which they are addressed and executed. By having fewer boxes that need to be managed and fewer addresses, this management traffic, which represents network overhead, is reduced.

Figure 2:
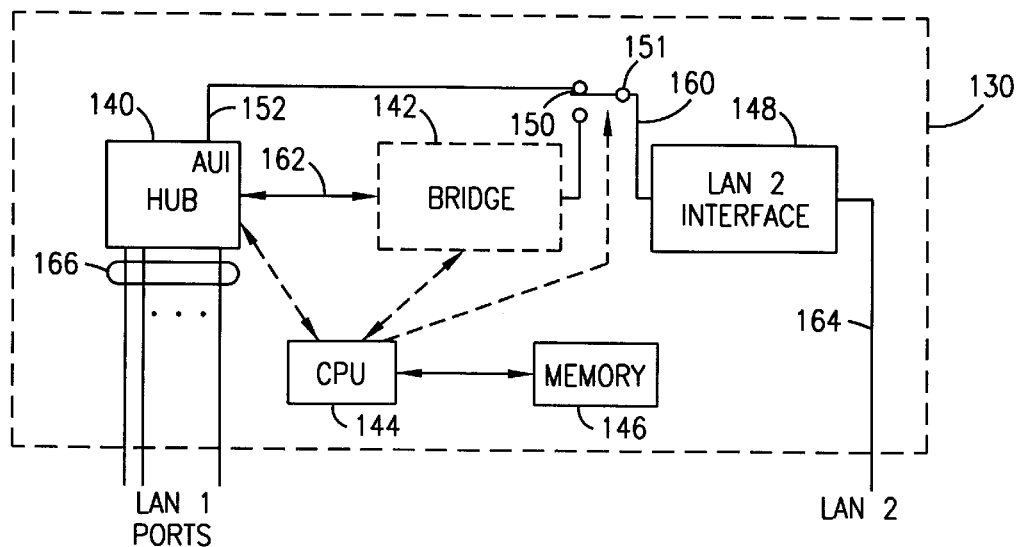
FIG. 2 is a block diagram of one embodiment of the invention employing the broad concept of integration of a bridge with a hub in the same package to share circuitry and eliminate points of failure which would exist if the bridge and hub were separate circuits.

FIG. 2 shows a highly simplified block diagram of an embodiment of the broad concept according to the teachings of the invention. The hub 140 and bridge process 142 are integrated in the same system and are supported by the same physical support structure and housed in the same housing. The hub 140 is connected to a plurality of individual transceiver lines shown collectively at 166. In addition, the hub and bridge functions share certain physical assets such as the CPU 144 and the memory 146. In a sense, the LAN 2 interface 148 is also shared, because in the bypass mode switch 150 is connected so as to couple an AUI port 152 of the hub 140 to LAN 2 through the LAN 2 interface 148. In bypass mode, LAN 1 and LAN 2 comprise a single local area network. Because the AUI port of the hub 140 cannot drive any physical media, the LAN 2 interface 148 is necessary to merge the machines coupled to LANs 1 and 2 into a single network even though the physical media of LAN 1 and LAN 2 may be different.

In the preferred embodiment, the bridge process 142 is a software process carried out by the central processing unit 144 using memory 146 and the bridging software routine described in flow charts given below and detailed in the source code appendix attached hereto. In other embodiments, the bridge 142 may be a hardware circuit which operates either autonomously or under the control of central processing unit 144. In either type embodiment, the hub and bridge functions will share the central processing unit and will be managed by the CPU implementing network management functions.

Bypass mode is useful for providing flexibility in network designs. It is most useful in planning for network growth where local area networks 1 and 2 may be connected together as single network when the level of network traffic is small enough such that the bandwidth limitations of the physical media do not impose a ceiling on the number of machines which may be connected. However, when the number of machines coupled to the network grows and the volume of traffic approaches 10 Megabits per second, the CPU 144 in FIG. 2 can alter the state of switch 150 such that the AUI port 152 is no longer coupled to bus 160 directly and bridge mode becomes active. When the bridge is active, because only traffic on bus 162 which has a destination address identifying a machine connected to local area network 2 will get through to LAN 2, the number of machines effectively sharing each network is substantially cut down. Thus, the amount of traffic on each network is cut down to a level which can be easily handled by the physical media.

Figure 3:
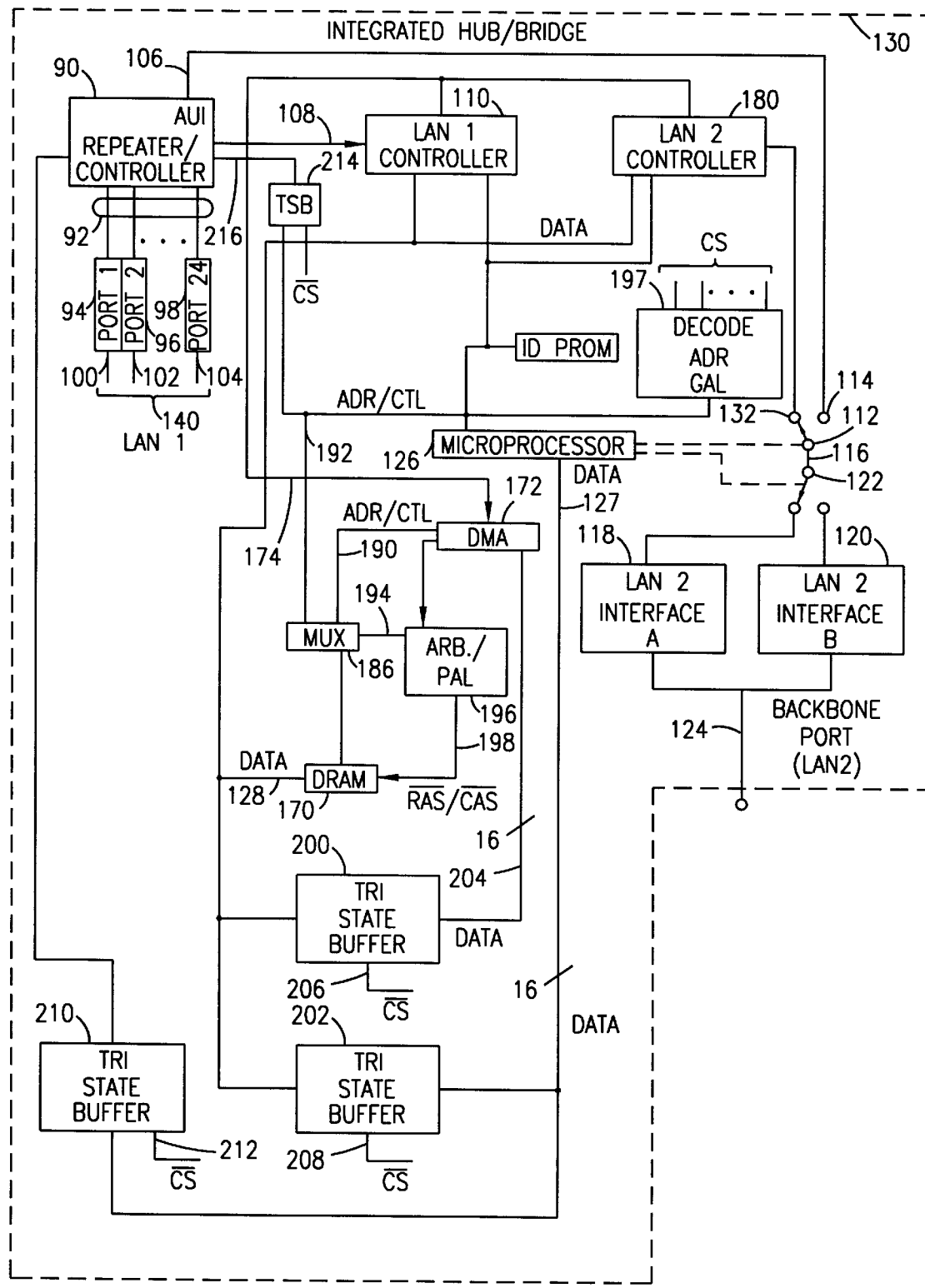
FIG. 3 is a block diagram of another embodiment of the invention with dual network two transceivers for fault tolerance.

Referring to FIG. 3, there is shown a block diagram of another embodiment of an integrated hub/bridge with redundant network two transceivers. A repeater/controller 90 has a plurality of repeater ports 92 each of which is coupled to a hub interface circuit such as the port 1 transceiver circuit 94, the port 2 transceiver circuit 96 or the port 24 transceiver circuit 98. Each of these port transceiver circuits interfaces between the network data link layer protocol implemented by the repeater/controller 90 and the particular physical layer protocol appropriate to the physical media being used to carry the data. The physical media is represented by lines 100, 102 and 104. The physical media may be unshielded twisted pair in the case of a 10BaseT hub, coaxial cable in the case of a 10Base2 hub, or fiber optic wave guides in the case of a 10BaseF or an FOIRL hub, etc. All of the examples given above are for the Ethernet network data link layer protocol, however the teachings of the invention are applicable to any network data link layer or physical layer protocol such as Token Ring, FDDI, etc. Further, the teachings of the invention are equally applicable to any communication model such as OSI and any transport layer protocol such as TCP/IP, XNS, IPX, AppleTalk, DECnet, and SNA.

Any data received through any one of the port interface circuits such as port 1 circuit 94 is automatically repeated by the repeater/controller 90 on all of the other ports 92. In addition, any received data packet is also repeated out an AUI port 106 and is also transmitted on a network one data bus 108 coupled to a LAN 1 controller 110. The AUI port 106 is a non-media specific port which can be coupled to a transceiver circuit which is appropriate to the particular physical media to be driven. The format of data packets and the collection of signal lines and signal definitions for an AUI port is set by a national standard in accordance with the particular communication data link layer protocol being used. However, the AUI port itself can drive a 50 meter AUI transceiver cable, but cannot drive the physical media of the network without a suitable network interface transceiver.

The AUI port 106 plays an important role in implementing a novel feature of some embodiments of the invention called bypass mode. In bypass mode the bridging function is bypassed, and the backbone port is treated as just another repeater port. In FIG. 2 this is physically implemented by connecting the AUI port 106 to a software controlled switch 112 in bypass mode. Switch 112 is set in bypass mode so as to connect terminal 114 to line 116. Line 116 can be coupled to the data input/output port of either of two LAN interfaces 118 and 120 through another switch 122. Switches 112 and 122 may be software controlled in some embodiments and manually operated in other embodiments.

The function of the selected LAN interface 118 or 120 is to drive whatever physical media is used for the backbone port connection 124 to network two. This backbone port physical media may be twisted pair, coaxial cable, fiber optic waveguide, etc. The purpose of having two LAN interfaces A and B is to provide fault tolerance redundancy such that if one fails, the other may be used. Both of the switches 112 and 122 are controlled by a microprocessor 126 in the preferred embodiment. This microprocessor is shared by all of the circuitry in the integrated hub/bridge 130. Normally, the microprocessor 126 will establish the position of software controlled switch 112 during an initialization phase at power-up time.

During initialization, data is written via data bus 127 to the repeater/controller 90 to set this device up for operation. The microprocessor 126 also reads data written by the user (or a front panel switch position in some embodiments) to determine whether bridge or bypass mode is desired. If bypass mode is desired, microprocessor 126 send a control signal to switch 112 so that terminal 114 is connected to line 116. If bridge mode is desired, switch 112 is controlled such that terminal 132 is coupled to line 116. Terminal 132 is coupled to a LAN 2 controller 180 which is driven by the bridge function carried out in software by microprocessor 126. LAN 2 controller is the network two interface for the integrated bridge.

The microprocessor 126 has multiple duties including: being shared by both the hub and bridge processes for initialization, on-line, in-band management and carrying out bridging duties in some embodiments although the bridge function could be carried out by separate circuitry in some embodiments. The microprocessor is only indirectly involved in the hub process since the repeater/controller 90 does the retransmission work without intervention by the microprocessor. The microprocessor can intervene in this process in executing management commands such as turning ports on or off and will report certain status data back to the network manager such as port polarity status, per-port error rate etc. In the bridge function however, the microprocessor plays a central role in executing the software that carries out the forwarding function. In most embodiments, the in-band management process runs in background while the bridge process runs in foreground.

In the bridging mode, data packets will be forwarded from local area network 1, 140, to local area network 2, 124, where appropriate, while in the bypass mode, local area network 1 and local area network 2 will be merged and will all be considered the same local area network by the hub.

The bridging function is carried out in the embodiment of FIG. 3 as follows. When a packet arrives from local area network 1, it is repeated on network one data bus 108 and received by LAN 1 controller 110. The LAN 1 controller 110 then cooperates with a DMA controller 172 to store the data packet in a receive buffer for network one in memory 170. At initialization time, the LAN controllers 110 and 180 are informed by the microprocessor 126 of the starting and ending memory locations of receive and transmit FIFO buffers in memory 170 for each of networks one and two. In some embodiments, the receive and transmit buffers are implemented as FIFO buffers using linked lists in memory 170. In other embodiments, separate FIFO memories could be used.

Since the microprocessor 126 also uses memory 170 to store the forwarding table entries for the bridging function, the data, address and control buses of the memory 170 must be shared between the DMA controller 172 and microprocessor 126. The details of how this bus sharing is carried out are not critical to the invention and any bus arbitration scheme will suffice for practicing the invention. In the preferred embodiment, when the LAN controllers receive packets, they request the DMA controller to store them, and the DMA controller requests bus arbitration PAL (programmable array logic) for access to the bus. If bus access is not immediately granted, the local area network controllers 110 and 180 can temporarily store data packets in internal buffers. When a data packet arrives and is stored in the receive buffer, an interrupt to the microprocessor is generated by the LAN controller which received the packet. This tells the microprocessor which network is the source of the packet and that the bridge process detailed below must be performed. The flow chart of FIGS. 5A and 5B below are the processing of an interrupt service routine which services the LAN controller interrupts in some embodiments.

The microprocessor 126 processes received data to be input to the bridging process by accessing memory 170 using a pointer to the received packet sent with the interrupt from the LAN controller. The microprocessor reads the destination address and consults the forwarding table. If the packet is to be forwarded, the microprocessor "deposits" the data packet in the transmit buffer corresponding to the appropriate network by rearranging the pointers on the linked list of that transmit buffer to point to the new data packet to be transmitted in sequence. The LAN controllers are continually requesting access to the memory buses through the DMA controller 172 and the arbitration PAL 196 to retrieve data packets from their respective transmit buffers. In the case of LAN controller 110, such packets are forwarded to the repeater/controller 90 via data bus 108 for repeating on all network one ports. In the case of the LAN 2 controller 180, these data packets are forwarded to the LAN 2 interface circuit 118 or 120 selected by switch 122 for transmission on the network 2 media.

The local area network controllers 110 and 180 manage pointers for their FIFO buffers so as to keep track of the addresses where the last message stored in the receive queue is located and the address of the next packet to be transmitted in the transmit queue and to keep the linked lists properly FIFO ordered.

Microprocessor 126 also establishes a management queue in the memory 170 where in-band management commands and requests are stored temporarily until a management process, running in background mode, can access and execute the desired function.

Arbitration logic 196 is used to grant access to the memory buses according to some appropriate access protocol. In some embodiments, the protocol might be first-come, first-served, while in other embodiments the access protocol may use some priority scheme as between the DMA device 172 and the microprocessor 126.

A multiplexer 186 under control of the arbitration PAL 196 selectively connects the address bus 188 of the memory 170 either to the address/control bus 190 of the DMA device 172 or the address/control bus 192 of the microprocessor 126 in accordance with a control signal on line 194. The arbitration logic 196 also generates the row address strobe and column address strobe signal (RAS*/CAS*) on line 198 so as to time division multiplex the bus 188 between 10 bits of row address and 10 bits of column address. The arbitration logic 196 is coupled to the microprocessor 126 address and control bus to receive input information by a connection not shown in FIG. 2.

Arbitration of the memory data bus is carried out through tri-state buffers 200 and 202. Tri-state buffer 200 selectively connects the data bus 204 of the DMA device to the DRAM memory data inputs 128 coupled to the LAN controller data outputs when a chip select signal on line 206 is true. Likewise, tri-state buffer 202 couples the data bus 127 of the microprocessor to the memory data inputs when a chip select signal on line 208 is true. These chip select signals are generated in some embodiments by an address decoder gate array 197 coupled to the microprocessor address bus. In other embodiment, they may be generated by arbitration/PAL logic 196 so as to control and arbitrate access to the DRAM data inputs as between the DMA device 172 and the microprocessor 126.

As in the case of the embodiment of FIG. 2, microprocessor 126 is shared by the hub function and the bridge function. Specifically, the microprocessor sends data to the repeater/controller circuit 90 at initialization time to set the circuit up for operation, sends data to it during operation to do certain things like turn ports on or off and receives data from the repeater/controller regarding status for purposes of replying to management inquiries regarding port status. Data is sent to and received from the repeater/controller 90 via the data bus 127 using a tri-state buffer 210. This tri-state buffer receives a chip select signal on line 312 generated by address decoder 197 or arbitration/PAL control logic 196. The address decoder or arbitration logic 196 also generates a chip select signal for a tri-state buffer 214 which gates the address/control bus 192 on the microprocessor through to the address and control inputs 216 of the repeater/controller circuit 90. Once the microprocessor has been granted control of these buses, data may be sent to the repeater/controller 90 to initialize it or to cause it to carry out certain management functions, or to receive status information therefrom in some embodiments. In the preferred embodiment, status information travelling from the repeater/controller 90 to the microprocessor is sent by the repeater through the LAN 1 controller.

In some embodiments, the bus arbitration logic may be eliminated altogether and separate memory circuits may be used for all entitles which need random access memory.

Figure 4:
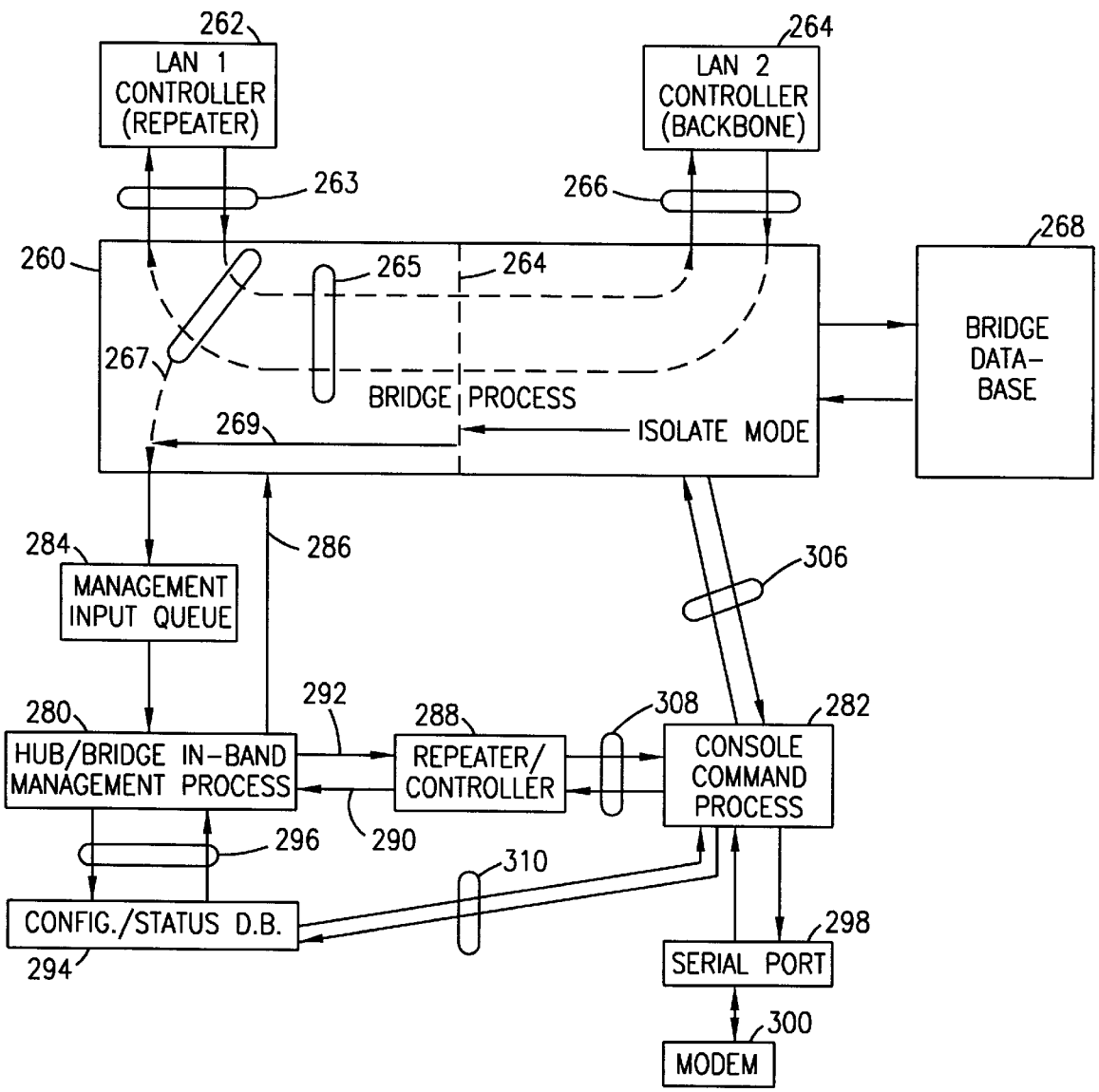
FIG. 4 is a data flow diagram illustrating the three software processes that are executed in the preferred embodiment, to perform bridging, in-band management and out-of-band management functions.

Referring to FIG. 4, there is shown a data flow diagram showing the data paths which exist between the three ongoing software processes of the preferred embodiment and several hardware and data structures which are involved therewith. In the preferred embodiment, a bridge process 260 is carried out in software in the foreground mode. As described above, the bridge process receives data from and sends data to a LAN 1 controller 262 via FIFO receive and transmit buffers in random access memory (not shown). This process is symbolized by arrows 263. Likewise, the bridge process sends data to and receives data from a LAN 2 controller 264 in a similar manner as symbolized by arrows 266. When the bridge process is active, i.e., when the hub/bridge is not in bypass mode, a bridge database 268 in random access memory is consulted for each incoming data packet. The purpose of consulting the bridge database is to determine whether or not the data packet should be forwarded to the other network controller. The bridge process will forward the data packet to another network controller other than the network controller from which the data packet was received if the bridge database 268 contains an entry indicating that the machine having the destination address of the data packet is not coupled to the network driven by the controller from which the data packet originated. If there is only one other network serviced by the bridge, the bridge process will forward the data packet to the network controller driving that other network. However, if the bridge process serves more than two networks, the bridge process will consult the bridge database to determine which network is coupled to the machine having the destination address of the data packet and forward the data packet to the appropriate network controller driving that network. Further, the bridge process will forward the data packet to another network controller if there is no entry in the bridge database indicating where the destination address lies.

The bridge database is built anew each time the machine is powered up. Therefore, while the bridge database is building, more packets will be forwarded to the other network controllers than are actually necessary until the bridge database contains entries for substantially all the destination addresses on the network serviced by the bridge process. However, in most protocols, each destination machine issues an acknowledgment message after it receives a data packet, and these acknowledgement messages will cause entries to be made in the bridge database if an entry for the source network address does not already exist. Therefore, an address will be put in the bridge database when the machine having that destination address either sends or receives the packet.

In some embodiments, the bridge database can be stored in non-volatile memory such as non-volatile RAM and the bridge process can cross-check the accuracy of the bridge database each time a packet is handled. That is, when a packet is received, the bridge database is checked for an entry for the destination address, and the packet will be forwarded if appropriate according to the above noted rules. However, if the acknowledgement message comes back through a different network controller than the network controller to which the packet was forwarded, the bridge process will realize that the machine having that destination address has been physically relocated to a different network segment, and will correct the bridge database entry for that destination address.

There are three basic types of bridges and various types of router processes known in the prior art. Any of these known bridge or router machines or software processes that carry out bridging or routing processes, when integrated with a hub so as to share certain common circuit elements are within the scope of the teachings of the invention. That is, the details of the bridge or routing process are not critical to the invention. Any known bridge or routing machine or software process will suffice.

All bridges provide network connections at the data link layer in the OSI model. The first type of bridge is a transparent bridge. This bridging function provides network connection to local area networks that employ identical protocols at the data link and physical layers. A transparent type bridge places no burden on the physical devices which are attempting to communicate. These devices take no part in the route discovery or selection process. From the device's point of view, it appears that all devices are resident on a single extended network with each device identified by a unique address. Processing by a transparent bridge can be summarized as follows:

(1) the bridge reads the data link layer destination addresses of all messages transmitted by devices on LAN 1;

(2) the bridge ignores all messages addressed to devices on LAN 1; (3) the bridge accepts all messages addressed to devices on LAN 2, and, in the physical layer and data link layer protocols common to both networks, relays these messages to LAN 2 (4). the bridge performs identical functions for all messages transmitted on LAN 2.

Obviously such processing requires that the bridge acquires some knowledge of the location of devices. All this information could be manually configured in some embodiments, but in the preferred embodiment, a learning function is used to acquire device addresses.

The bridge learns addresses by reading the data link source address of each message that it receives.

In some embodiments, the forwarding table entries include a timer value that indicates the age of the observation.

The translating bridge is a specialized form of transparent bridge. This type bridge provides network connection services to local area networks that employ different protocols at physical and data link layers. For example a translating bridge would be used between a token ring protocol local area network and Ethernet protocol local area network.

A translating bridge provides connection services by manipulating the "envelopes" associated with each type of local area network. Processing performed by a translating bridge is relatively straightforward because the Ethernet, Token Ring and FDDI envelopes are somewhat similar. Each local area network type, however, sends message of different lengths. Because a translating bridge cannot fragment messages, each local area network device must be configured to transmit messages of the supportable length. For the example of a translating bridge being used between Token Ring and Ethernet networks, translating bridge processing can be summarized as follows:

1. The bridge, using the physical and data link layer protocols employed by LAN 1 (the Token Ring protocol), reads the data link layer destination addresses of all messages transmitted by devices on LAN 1.
2. The bridge ignores all messages addressed to devices on LAN 1.
3. The bridge accepts all messages addressed to devices on LAN 2 (the Ethernet protocol), and, using the physical data link protocols employed by LAN 2 relays these messages to LAN 2.
4. The bridge performs identical functions for all messages transmitted on LAN 2.

The second bridge type, an encapsulating bridge, is generally associated with so-called "backbone" topologies. In such a topology, several local area networks will be coupled by several bridges to a high volume backbone of such as a fiber optic FDDI protocol. A typical example of such a topology would be for Ethernet local area networks linked together by a high speed FDDI backbone. Each local area Ethernet network would be connected by an encapsulating bridge to the FDDI backbone. This would be necessary because the inter-network connection (the backbone) is coupled to networks that uses different physical and data link layer protocols.

Unlike translating bridges which manipulate the actual message envelope, encapsulating bridges place received messages within a backbone specific envelope (thus, the term encapsulating) and forward the encapsulated message to other bridges for eventual delivery to the message recipient. In the following example, four Ethernet networks are coupled to an FDDI backbone by four encapsulating bridges. The four bridges coupled to Ethernet networks 1 through 4 will all be referred to as bridge 1 through bridge 4. In the foregoing example, a message from a device on local area network 1 intended for a device on local area network 2 will be processed by an encapsulating bridge as follows:

1. The bridge coupled to local area network 1, using the physical and data link layer protocols employed by network 1 (Ethernet), reads the data link layer destination addresses of all messages transmitted by devices on network 1.
2. Bridge 1 ignores all messages addressed to devices on local area network 1.
3. Bridge 1 accepts all messages addressed to devices on other local area networks, places these messages within an FDDI specific envelope addressed to all bridges (such a collective address is called a multicast address), and sends this envelope across the FDDI backbone.
4. Bridge 3 receives the message, removes the outer envelope and checks the destination data link address. As the destination address is not local (the destination address is a device coupled to local area network 2) bridge 3 ignores the message.
5. Bridge 2 receives the message, removes the outer envelope and checks the destination data link address. As the address is local, bridge 2 uses Ethernet physical and data link layer protocol to forward the message to the destination device.
6. Bridge 4 receives the message, removes the outer envelope and checks the destination data link address. As the address is not local, bridge 4 ignores the message.
7. Bridge 1 strips the encapsulated message from the FDDI backbone.

The third type of bridge is called a source routing bridge. This ferm was coined by IBM to describe a method of bridging frames across Token Ring networks. Source routing requires that the message source (not the bridge) supply the information needed to deliver a message to its intended recipient.

Within a source routing network, bridges need not maintain forwarding tables. Rather they make the decision to forward or to drop a message solely on the basis of data contained within the message envelope. To implement such a scheme, each routing device determines the route to a destination through a process called route discovery. Route discovery can be accomplished in several ways.

One way is to implement a route discovery process using so-called "explorer packets." Each explorer packet has a unique envelope which is recognized by all the source routing bridges in a particular network configuration. When a device coupled to one local area network wishes to send a message to a device coupled to another local area network, the source device sends out an explorer packet which reaches one or more of the source routing bridges. Each source routing bridge adds its own name and the network connection from which the explorer packet was received in a section of the message envelope called the routing information field. Each source routing bridge then floods all of its network connections with copies of the packet.

Ultimately, the destination machine receives multiple copies of the explorer packet each of which has taken a different route through the network configuration. The route that each packet took can be traced from the information in the routing information field of each explorer packet.

The recipient machine then picks one of the packets for use either randomly or according to some criteria which is not critical to the invention such as the most direct route, and sends a response message back to the originator which lists the specific route to be used in communicating with that device. The source device then receives this message and records the route to be used in communicating with the destination device in a memory which stores routing information for each device for which a route has been discovered. Subsequent messages are enclosed in a different type of envelope which is recognized by source routing bridges. These bridges then consult their routing tables for the list of connections in bridges and forward the message based upon the routing information stored in memory.

Routers are different from bridges in that routers connect devices at the network layer of the OSI model. The connected networks may have different protocols at the data link and the physical layers. Routers actively select paths to use in connecting one device to another based on certain factors such as transmission costs, network congestion, transit delay or distance between the source and destination. Distance is usually measured in terms of the number of routers that must be traversed between the source and the destination. Routers are not transparent in that the devices which wish to use the services of a router must address their messages directly to the router.

Each local area network has a unique local area network address which is resident in the network layer of the OSI model. Likewise, each device on a local area network has its own address which is unique to that local area network This is the data link layer address in the OSI model. A complete device address then in a routing environment will be either the addition or concatenation of the network layer and data link layer addresses.

Each source device, after preparing a message packet, compares the source address with the destination address and recognizes whether or not the message can be sent directly to the recipient on the network segment to which the source device is connected or whether the message must be routed. If the message must be routed, it is placed in an outer envelope with an address of the first router to which the message must be sent. The targeted router then opens the outer envelope and looks at the destination address. However, the router has multiple addresses in its routing table, one for each network connection to which it is coupled. If the router determines that the destination address is a device on one of the networks to which it is coupled, it sends the message directly to the appropriate network using the appropriate data link and physical layer communication protocols.

If the router is coupled, for example by a wide area network, to other routers, a router table is consulted. This table has entries in it each of which has a pair of data fields. The first field identifies a destination network and the second field identifies an adjacent router in the direction of that destination. A message which must be forwarded through another router will be forwarded by consulting this routing table and will be enclosed within an outer envelope and sent to the adjacent router "in the direction of", the destination address. This second router will open the envelope of the message when it is received, do a network address comparison and then forward the packet directly to the destination device.

Routers use routing protocols to exchange information about the network.

These routing protocols are software routines which run in the router. The exchange of information implemented by these routing protocols eventually causes the routing tables in all of the routers to converge so as to reflect the same network topology.

There are two types of routing protocols. The older type distance-vector protocol periodically issues broadcasts which propagate routing tables across the network. These routing protocols are useful mainly for small and relatively stable networks. Large and/or growing networks generally use data link-state protocol exemplified by the IS—IS routing protocol of the OSI model. Link state protocols send routing information only to reflect changes in the network topology. While distance-vector routing protocols always pick the path with the fewest number of routers between the source and the destination, link state protocols are different. Link state protocols can use multiple paths for failure recovery and load balancing of message traffic. Link state protocols also allow users to specify selection of routes according to delay, throughput, or reliability concerns.

Referring again to FIG. 4, the teachings of the invention also therefore encompass substitution of any of the known bridge types or a routing process for the bridge process symbolized by block 260. In the case of a router, routing tables would be substituted for the bridge database 268.

In some alternative embodiments, the microprocessor shared by the bridge functions also runs two background processes for management purposes. These background processes are symbolized by the hub/bridge in-band management process 280 and the console command process 282 in FIG. 4. The in-band management process 280 consists of a number of subroutines each of which is capable of carrying out a particular management function. These management functions are well-known to those skilled in the art and will not be detailed here nor are the details of the in-band management process critical to the invention. The teachings of the invention contemplate the fact that a single in-band management process may be shared by both the hub and the bridge functions and this management process is distributed in the sense that it is contained within the same housing as the integrated hub and bridge hardware so no failure between the network address of the hub/bridge circuitry and the network address of the management process can cause the hub/bridge circuitry to be uncontrolled.

Also, to implement one aspect of the "open system" architecture, the management process 280 conforms to the SNMP network management protocol selected as a national standard by the Internet Engineering Task Force (hereafter IETF). This means that other systems that have management software can also manage the integrated hub/bridge of the invention by sending SNMP management commands in via the modem 300, the serial port 298 and the console command process 282 and these commands will be understood by the hub/bridge management process 280 and carried out. Further, under the prior art SNMP network management protocol, every device connected to a network has data structures called MlBs which are unique to the product. MlBs effectively describe every "object", i.e., every controllable entity and some entitles that are "read-only" in a particular system and describes the various states that each entity can assume. The MIB data is used by SNMP management processes to control or read the objects thereby allowing management of the system described by the MIB data. To implement the open system architecture of the hub/bridge according to the teachings of the invention, the electronics and software of the hub/bridge 130 according to the "open architecture" species within the genus of the invention implement the following national open systems internet and TCP/IP based standards: RFC 791 (Internet Protocol); RFC 792 (Internet Control Message Protocol); RFC 793 (Transmission Control Protocol); RFC 768 (User Datagram Protocol); RFC 783 (Trivial File Transfer Protocol); RFC 826 (Address Resolution Protocol); RFC 854 (Telnet Services); RFC 903 (Reverse Address Resolution Protocol); RFC 1058 (Routing Information Protocol); RFC 1157 (Simple Network Management Protocol) RFC 1213 (MIB II); RFC 1286 (Bridge MIB); RFC 1317 (RS232-Like MIB); RFC 1368 (Repeater MIB); RFC 1398 (Ether-Like MIB); Draft RFC 802.3 MAU; IEEE Standard 802.1(d) Spanning Tree Algorithm, Filtering by Protocol. All the foregoing national standards are published by the IEEE or the IETF and are hereby incorporated by reference.

What the foregoing means is that the hub/bridge according to the teachings of the invention can be mixed into a network environment with equipment made by other manufacturers that support the same national standards and all the equipment will work together. Further, the invention contemplates that the bridge, hub and all other MIB descriptions are all integrated into one easily manageable entity such that installation is simplified in that the installer does not have to learn the complexities of the installation process for a hub and then learn the complexities needed for a separate bridge circuit installation also.

An important aspect of the invention is in the "network slice" stackable architecture implemented by the integrated hub/bridge. This architecture is especially useful in small networks and to solve the problems noted above with concentrator technology. Fundamentally, a "network slice" is a small, stand-alone repeater with integrated bridge and integrated management. More specifically, as the term is used herein, the genus of machines each of which may be referred to as a "network slice" is a stand-alone hub or repeater with 26 or fewer ports, having its own enclosure and user interface switches and indicator light, and having a built-in, i.e., integrated bridge to couple the repeater ports to a backbone, a local backbone or another repeater and LAN segment, and having distributed management, i.e., a collection of subroutines in the control software that can understand management commands and requests for data originated by a network administrator. An important species of this genus has a bypass mode to allow small networks to grow beyond the Ethernet 10 Mb/sec speed limit and then turn off bypass to allow both segments on both sides of the bridge to have traffic at less than the 10 Mb/sec limit. Another important subspecies of this genus is remotely manageable.

Network slices can solve the problems of, concentrators noted in the background section of this application by allowing a network slice to be located out at the location of a group of users which is too small to justify having a dedicated concentrator. The network slice is substantially less expensive than a concentrator and can handle up to 26 users connected to each network segment on either side of the bridge so substantial pockets of physically isolated users can be handled relatively inexpensively. Network slices are "stackable" in that the individual network slices can each stand alone or work together to handle large networks via connections to each other over local "backbones", i.e., network segments coupled to the integrated bridge which may have different physical media and protocols than the network one LAN segment coupled to the hub. This means that as the network grows in number of users, new network slices can be added in smaller increments than would be possible if concentrator technology was used, and this costs less. Thus, in the hypothetical situation posed in the background section of this application, the remote network slice located at the pocket of physically separated users can also send data to other network slices at the parent company or on a different floor via the single line of the local backbone connection. This can save substantially in installation costs by eliminating the need to run separate cables for each user from the physically isolated pocket of users back to the main concentrator. Of course, a local backbone LAN segment can be used only if the distance between the network slices is small enough to be less than the maximum allowable range for the media type used for the backbone connection. If the distance is larger than this maximum distance, the network two segment is replaced with a WAN transceiver (wide area network media access unit or MAU).

The fact that a network slice has on-board integrated management software means that the network slice can be remotely managed. This is a substantial advantage in a situation where a concentrator serves the main network but there is an isolated pocket of users which is too small to justify another concentrator but with users who need to share assets on the main network. With a network slice, the network administrator can run the management process on a work station coupled to the main network and send management commands and data requests either in-band over the backbone connection or via modem to the management process resident in the network slice located out with the isolated pocket of users. With a concentrator, this is not possible, because the management process is located on a card that must fit in a slot in the concentrator, so unless the isolated pocket of users has their own concentrator, the network segment they are on cannot be managed from the main network.

As mentioned previously, the most important species in this "network slice" genus has "open architecture". Another important species utilizes a bypass mode wherein the bridge function is bypassed and the two LAN segments connected to either side of the bridge are connected together to form a single LAN.

In the broadest open architecture species of the invention, the software executed by the microprocessor 144 of the bridge/hub 130 in FIG. 2 will implement only the Internet Protocol defined by the national standard RFC 791 on the network layer of the ISO model. This specification is publicly available from the IETF and defines the network layer protocol used on Ethernet and defines, among other things, how destination network addresses and destination node addresses are used to route data packets to the appropriate machines on the LAN. This species of network slice would be a device which would not understand SNMP management commands.

There is a virtual necessity in the open systems market for network devices which can be managed from devices made by other manufacturers. The vehicle to achieve this interoperability is through implementation of the SNMP management protocol. Therefore, an important species of the network slice genus of the invention is a network slice, as that term was earlier defined herein (a network slice includes on-board "distributed management" functionality) with open architecture. Such a machine includes, in the software executed by the microprocessor 144, routines which implement the SNMP (simplified network management protocol) defined in the national standard RFC 1157 specification published by IETF at the session and/or presentation layer of the ISO model. The SNMP protocol routines in the control software interface to the Internet Protocol on the network layer through software executable by microprocessor 144 which implements the User Datagram Protocol defined in the national standard RFC 768 published by the IETF.

Although open systems management requires SNMP management protocol to be implemented in the control program, the network slice genus does not require that the distributed, i.e., on-board management process be restricted to only understanding SNMP commands and requests. The network slice genus can also be managed directly via direct connection of the network administrator's computer to the RS232 port 298 in FIG. 4 or via a modem. In such an embodiment, it is necessary for the control program executed by the microprocessor 144 to have routines that implement the Console Command Process 282 in FIG. 4 to issue appropriate commands and requests for data to the bridge process 260 or the repeater/controller 288 via data paths 306 and 308, respectively. However, if management of the network slice is to be done "in-band" via packets sent over the Ethernet™ LAN, then those skilled in the art will appreciate that the control software executed by the microprocessor 144 must include routines which implement the TELNET Services protocol defined by IETF in their national open systems standard RFC 854, the Transmission Control Protocol (TCP) defined by IETF in their national open systems standard RFC 793 as well as the Internet Protocol (IP) defined in RFC 791 along with the Internet Control Message Protocol (ICMP) defined in IETF national open systems standard RFC 792 and the Address Resolution Protocol (ARP) defined in RFC 826 as well as the Reverse Address Resolution Protocol (RARP) defined in RFC 903.

The way this all works together to allow in-band management of the network slice via a non-SNMP management process is as follows. When a management packet arrives at a repeater port, the physical layer hardware and software examines the MAC, i.e., Ethernet destination address thereof (which will be the MAC address of the bridge process) and causes the packet to be directed to the bridge process 260 in FIG. 4. From there the packet is directed to the in-band management queue 284 in FIG. 4 and ultimately is retrieved for processing by the hub/bridge in-band management process 280. This process 280 includes routines which implement the IP, ICMP, ARA, and RARA protocols previously mentioned. These protocols examine the data portion of the data link layer packet received from the port and derive the Destination Network Address and Destination Node IP addresses therein. The resulting data is then passed to the TCP protocol which converts the format of the data to text strings that the TELNET protocol can understand and converts the IP address to a port or socket address which is assigned to the hub/bridge in-band management process. The TELNET terminal emulator protocol then takes the data and converts it from its text string format to a line oriented format that can be understood by the Console Command Process 282 and passes the data to the non-SNMP Console Command Process 282 for execution in controlling the network slice. For data passing the other way, i.e., from the network slice hub/bridge to the remote non-SNMP management process in-band via the Ethernet physical media, the reverse sequence of events occurs. First, the TELNET protocol converts the line oriented strings of data that it receives from any object not of an SNMP type and converts that data into text strings that can be transported by the TCP/IP protocol. These strings must then converted to data link layer packets suitable for transmission on the Ethernet physical media by other routines in the control program executed by the microprocessor 144 that implement the TCP, IP, ICMP, and the RARA protocols. The protocols discussed in this specification are known to those skilled in the art.

Other important species of the network slice genus allow remote upgrading of the software which the microprocessor 144 executes. In an open systems embodiment of a network slice with this capability, the software of the control program has routines which implement at the transport layer the Trivial File Transfer Protocol (TFTP) specified by IETF in the RFC 783 national standard. The TFTP Protocol Interfaces with the physical media through the Internet Protocol on the network layer and the EtherTalk™ Link Access Protocol on the data link layer. This allows new and improved versions of the control program which controls processing by the microprocessor 144 to be loaded into the hub/bridge by the network administrator via a modem or in-band through whatever network path connects the network administrator's machine and the hub/repeater.

To understand the significance of the savings in network management traffic from combining the hub and bridge, some information about typical network management commands is helpful. Typical of management functions are to turn ports on and off, set protocol filtering, inquire regarding network traffic volume, inquire as to polarities status at each port, inquire as to the number of errors which are occurring on a particular port, analyzing traffic patterns on individual networks and across bridges, collecting data detected by the intelligent hub repeater circuits regarding errors and error types on a per-port basis, obtaining statistical data regarding the number of packets forwarded versus the number of packets received, configuring the repeaters via software commands, putting the bridge in bypass mode, etc. An intelligent hub allows ports to be turned on or off, provides error correction and can provide statistics regarding traffic volume.

The sole job of the hub/bridge in-band management process 280 is to receive so called in-band management commands and status inquiries and to process them. In-band management commands and inquiries are basically management messages which arrive like other data packets through one of the local area network controllers such as devices 262 or 264 in FIG. 4. This allows the network manager to manage components across the whole network while being connected to only one component thereof.

To implement the in-band management process, the bridge process 260 monitors data packet message traffic coming from the local area network controllers 262, 264 for any data packets having a destination address assigned to the integrated hub/bridge. These packets are forwarded to the in-band management process. These data packets are forwarded by placing them in a management input queue 284 implemented as a FIFO buffer in memory.

Typically the in-band management process runs in the background, so when a time slice is awarded to the management process or an in-band management interrupt occurs, the in-band management process 280 reads the next management command or inquiry in the input queue 284 and processes the management function appropriately. This process may involve sending protocol filtering commands to the bridge process 260 via data path 286 or collecting information from the repeater controller 288 via path 290. It may also involve sending commands to the repeater/controller 288 via path 292. Likewise, it may involve writing data to a configuration/database 294, or obtaining information from that database as symbolized by data paths 296.

Out-of-band management is carried out by the background console command process 282 in some embodiments. Out-of-band management commands and status inquiries are commands received not as data packets from the LAN controllers but received directly from the network manager's terminal. In some embodiments, these commands are received via a serial port 298 which may be connected to a modem 300 or a terminal. In some embodiments, two serial ports may be used, one connected to a modem and one connected to a terminal. This allows a network manager to dial in via the telephone lines from a terminal at home and issue management status inquiries and network management commands via the modem 300. The network manager may also issue any of the network commands or status inquiries via a terminal 302 in his or her office. The function of the console command process 282 is to receive these commands and status inquiries and interact appropriately with the repeaters, bridge process or configuration/status database to carry out the desired function. This interaction is carried out via data paths 306, 308 and 310. In the case where the management command is not addressed to the hub/bridge to which the network manager is directly connected, the console command process places the command in a data packet and places it in the transmit queue of the appropriate network controller so that it will eventually reach the destination component to be managed.

Figure 5A:
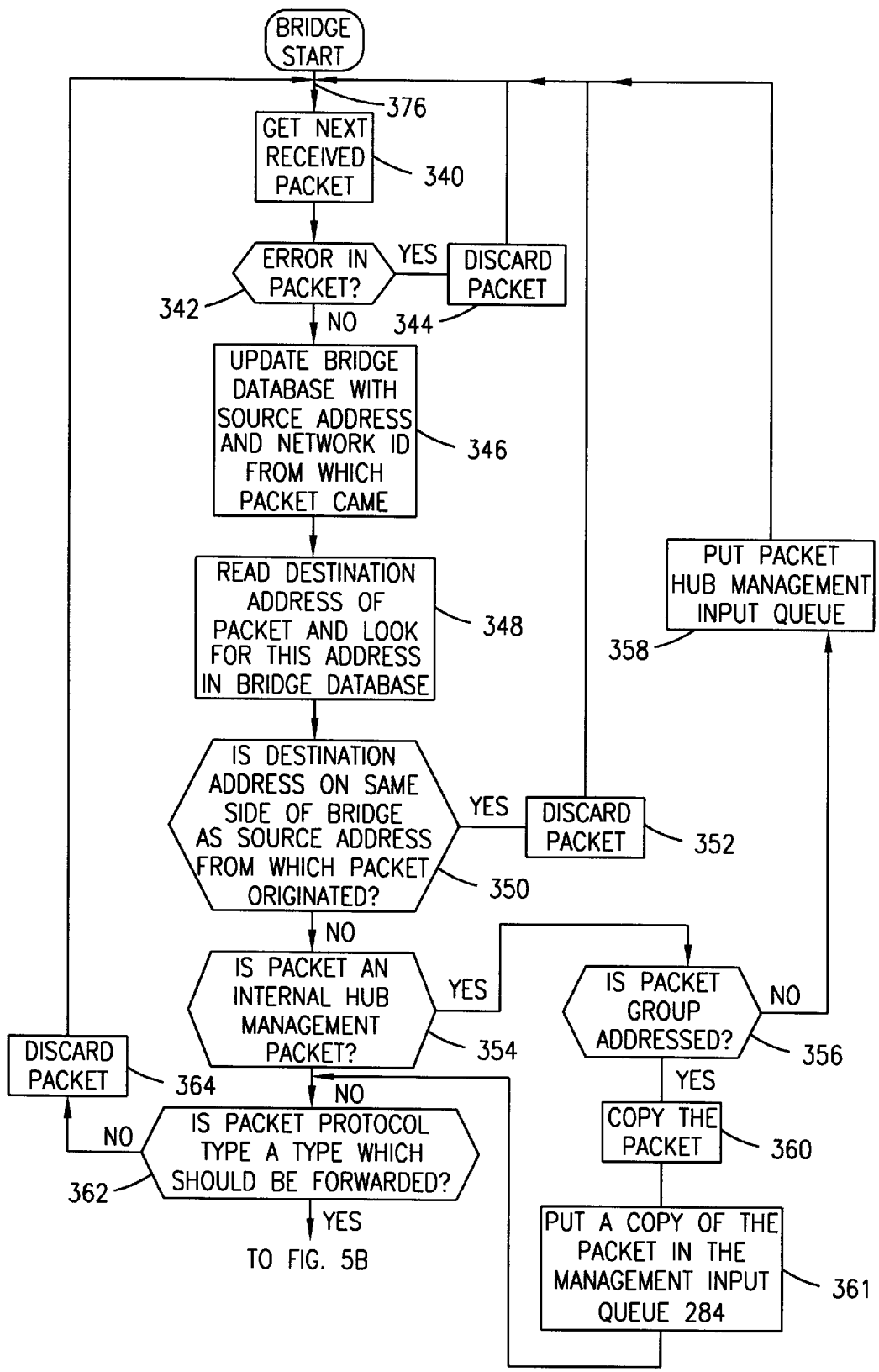
FIGS. 5A and 5B are a flow diagram of the processing of the bridge process illustrating operation of the forwarding vectors.
Figure 5B:
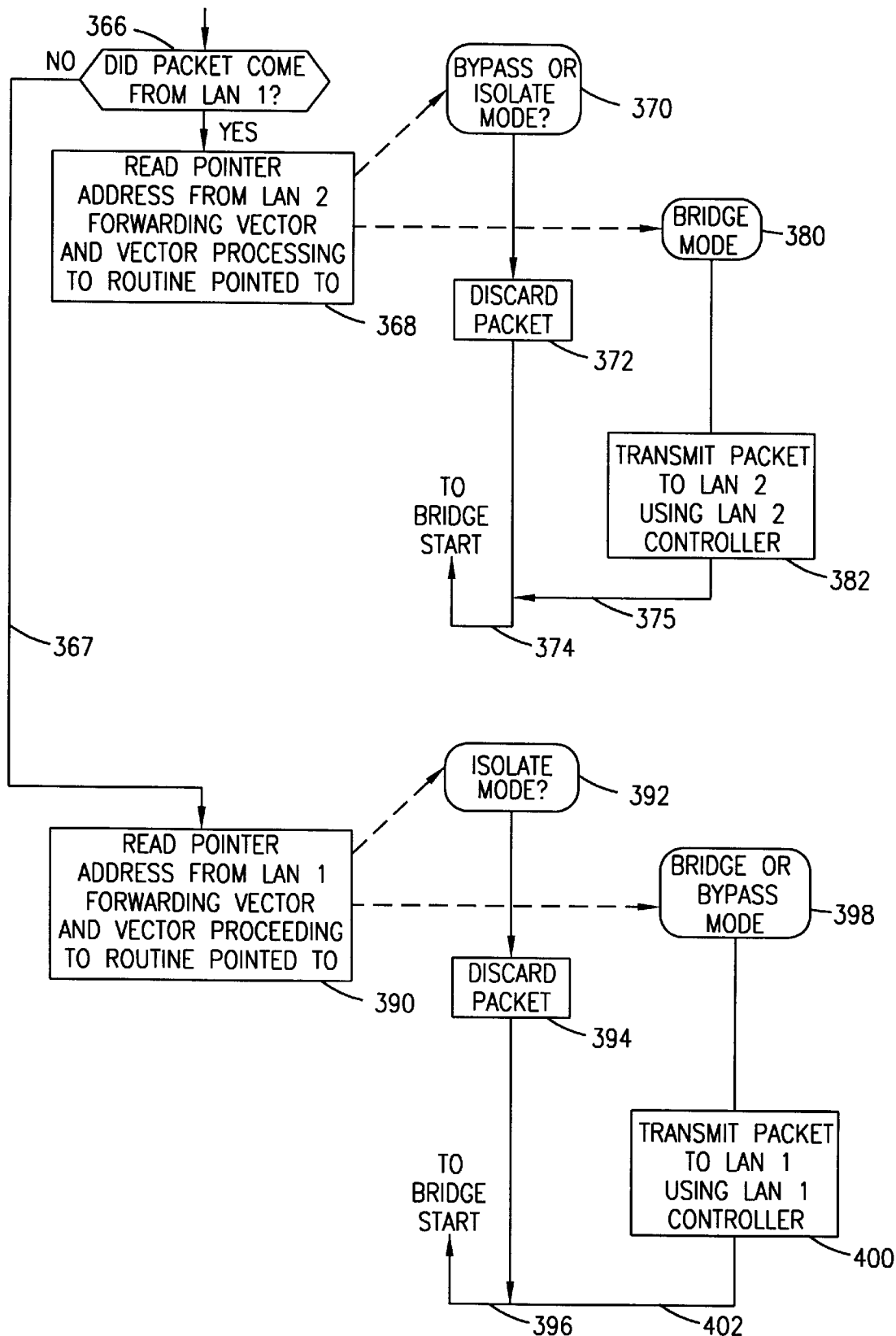

Referring to FIGS. 5A and 5B, there is shown a flow chart of the software bridge process used in the preferred embodiment. This process starts with the step symbolized by block 340 of getting the next received packet out of the FIFO receive buffer in memory after having received the interrupt from the LAN controller.

Next, the test of block 342 is performed to determine if there is any transmission error in the packet. If there is an error, the packet is discarded, as symbolized by block 344.

If there was no error, the process of block 346 is performed to update the bridge database. This is done by examining the source address of the packet and the network identification, i.e., the LAN controller, from which the packet came and writing this information into an entry into the bridge database forwarding table.

Next, the process of block 348 is performed to read the destination address of the packet and look for this address in the bridge database forwarding table.

The test of block 350 is then performed to determine if the destination address is on the same side of the bridge, i.e., on the same network, as the source address from which the packet originated. If the destination address is on the same side of the bridge as the source address, the packet is discarded as symbolized by block 352. The discard process involves rewriting the pointers on the linked list of the receive buffer to remove the discarded packet from the linked list.

Next, the destination address of the packet is read to determine if the destination address is the address which has been assigned to the integrated hub/bridge on which the bridge process is running. This process is symbolized by block 354 in FIG. 5A. If the packet is an internal hub management packet, then the test of block 356 is performed to determine if the packet is group addressed. In some protocols, the packets may be addressed to multiple network addresses with a single multicast or group address. If the packet is not a multicast packet, then the step symbolized by block 358 is performed to put the in-band management packet into the hub management input queue symbolized by block 284 in FIG. 4. Note that this monitoring process for in-band management data packets goes on even if the bridge is in bypass mode since there has been no step in the process shown in the flow chart of FIGS. 5A and 5B up to this point to determine whether the bridge is in bypass mode or bridge mode. Bypass mode is symbolized in FIG. 4 by the dashed lines 265. The process of filtering out in-band management packets for forwarding to the hub/bridge in-band management process while in the bypass mode is symbolized by dashed line 267 in FIG. 4. Also, note that FIG. 4 is somewhat deceptive in that the LAN 1 controller 262 is actually the network connection for the bridge to the network serviced by the repeater/controller shown at 90 in FIG. 2 and 140 in FIG. 3. Conversely, the network segment "on the other side" of the bridge is symbolized by the network connection to the LAN 2 controller 263. LAN controller 263 services the backbone connection network segment. The physical media for this backbone connection is shown at 124 in FIG. 2 and 164 in FIG. 3. Note that in FIG. 4 there is no apparent data path between the repeater/controller 288 and the bridge process, but this data path does exist through the LAN 1 controller 262.

In an alternative embodiment, an isolate mode is implemented in the hub/bridge software. The purpose of this isolate mode is to cut off data packets from being forwarded between networks one and two. This helps isolate problems on the network for troubleshooting purposes. In isolate mode, the bridge process discards all incoming data packets from either network except in-band management packets such that no data packets get forwarded from one network to the other. In-band management packets get selected from the data stream and are placed in the input queue of the hub/bridge in-band management process 280. Thus the management of the network can continue during isolate mode to assist in the troubleshooting process. Isolate mode is symbolized by dashed barrier line 264 in FIG. 4, and the process of selecting in-band management packets for forwarding to the in-band management queue is symbolized by dashed line 269. The isolate mode can be implemented in any manner, but in the preferred embodiment of the integrated hub/bridge, it is implemented by setting the pointer addresses in the forwarding vectors to be described below to point to a packet discard routine. This is done in the initialization code in the preferred embodiment, but could be done at other times by the network manager in other embodiments. Further, in some embodiments, forwarding vectors need not be used, and the bridge process can, for example, check a status register having contents set by the user to determine the current mode of operation and then process the incoming packets accordingly.

Referring again to FIG. 5A, if the step of block 356 determines the packet is a multicast packet, then the step symbolized by block 360 is performed to copy the packet. After making a copy of the packet, the packet copy is placed in the input queue for the hub/bridge in-band management process as symbolized by block 361.

If the step of block 354 determines that the data packet is not an internal hub management packet, or the packet was a multicast hub management packet and was copied by block 360 and loaded in the management input queue, then the test of block 362 is performed. This test is to determine if the protocol of the packet is a protocol type for which a filter has been activated. An active filter condition indicates that the user does not desire packets with this communication protocol to be forwarded, even if the destination address is such that the packet would otherwise be forwarded. Protocol filtering is a feature of the bridging process which may be activated by the network manager either through an in-band management command or a out-of-band management command entered through the console command process symbolized by block 282 in FIG. 4. In some situations, it is desirable for example to prevent any Ethernet protocol packets from being forwarded from an Ethernet local area network on one side of the bridge to a Token Ring network or an FDDI backbone connection on the other side of the bridge. In this case, the network manager simply sets a protocol filter blocking any Ethernet data packets from being forwarded. This is the purpose of the test on block 362. If block 362 determines the packet should not be forwarded because it has a protocol which is being filtered out, then the step of block 364 is performed to discard the packet.

If the test of block 362 determines that the packet protocol is a type which is not being filtered, then the test of block 366 is performed to determine if the data packet came from the LAN 1 controller. If it did, the process of block 368 is carried out to read a pointer address from a LAN 2 forwarding vector. This pointer address is written during initialization of the integrated hub/bridge circuit by the microprocessor. The particular pointer address written into the memory location assigned to the LAN 2 forwarding vector will depend upon whether the user has indicated that the hub/bridge is to operate in the bypass mode, bridge mode or isolate mode. There is also a LAN 1 forwarding vector which is assigned a different memory location. The LAN 1 forwarding vector also stores a pointer address. This pointer address is also written during initialization time, and will point to a routine which carries out the desired processing of either the bypass mode, bridge mode or isolate mode. The user indicates in any known manner such as front panel switch positions which mode is desired. Thereafter, at initialization time, a pointer address appropriate to the selected mode is written into the LAN 1 and 2 forwarding vectors. The process of step 368 will read the LAN 2 forwarding vector and vector processing to block 370 if either bypass or isolate mode is selected, or to block 380 if bridge mode is selected.

Figures 6A, 6B:
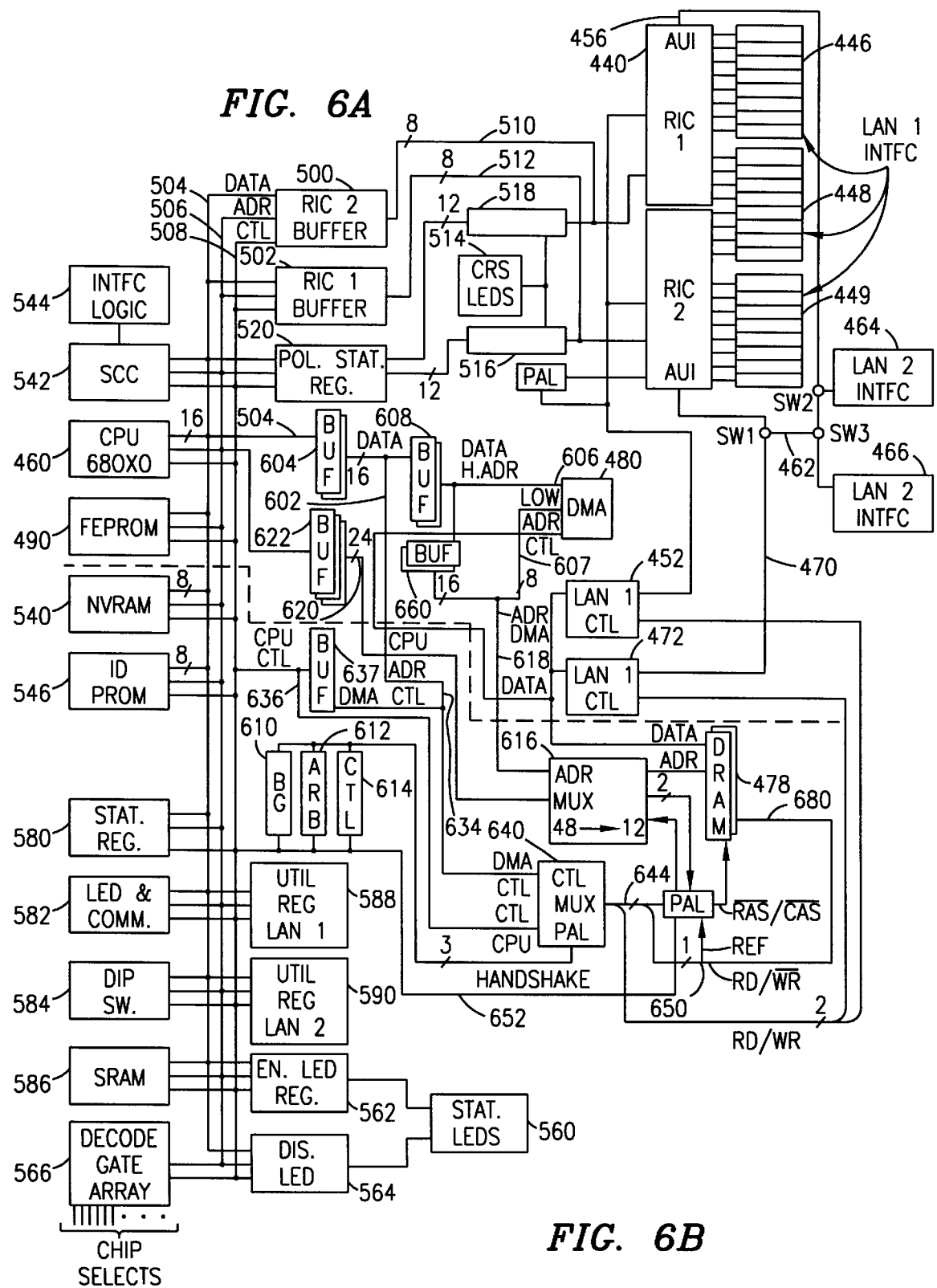
FIGS. 6A and 6B are a block diagram of the circuitry of the preferred embodiment.

If the LAN 2 forwarding vector points to the bypass or isolate mode, then the step symbolized by block 372 is performed to discard the packet. Discarding the packet implements bypass mode by virtue of the switch positions, e.g. switch SW1 in FIGS. 6A and 6B being set by a routine which is not shown to a switch position in bypass mode so as to connect the LAN 2 interface 466 or 464 directly to the AUI port of the repeaters 440 and 442. Thus any packet that arrived at a LAN 1 port is automatically sent out on LAN 2, and vice versa. In isolate mode, the switch positions for, e.g., switch SW1 in FIGS. 6A and 6B, are set so that the LAN 2 interface 466 or 464 are connected to the LAN 2 controller 472. Thus, discarding the packet by the bridge process prevents any transfer of packets from LAN 1 to LAN 2 or vice versa. Processing then returns via path 374 to the top of the bridge loop at 376 in FIG. 5A.

If the LAN 2 forwarding vector points to a routine for the bridge mode, then the processing of step 382 is performed to transmit the data packet to LAN 2 using the LAN 2 controller. This is done by the LAN 2 controller placing the packet into the transmit buffer for LAN 2. This process entails rewriting the pointers on the linked list for the transmit buffer to include the new packet in sequence in some embodiments. Processing is then returned to the top of the loop via path 375.

If the test of block 366 determined that the packet did not come from LAN 1, then in the preferred embodiment, the data packet must have come from LAN 2. This is only true in the isolate or bridge modes however, because in the bypass mode, the switch positions of, for example, switch SW1 in FIGS. 6A and 6B, are set such that the LAN 2 controller is not coupled to any LAN. Therefore, path 367 will only be taken when the hub/bridge is operating in either the isolate or bridge modes. In that case, the process symbolized by block 390 is performed to read the pointer address from the LAN 1 forwarding vector and vector processing to the routine pointed to by that vector. In isolate mode, the processing of block 394 is performed to discard the packet, and control is returned via path 396 to the top of the bridge loop. This implements the isolate mode in the same way as described above by preventing the transmission of the packet from LAN 2 to LAN 1 as there is no direct connection in this mode from the repeater AUI port to LAN 2.

In bridge mode, the step of block 400 is performed to forward the packet to LAN 1 using the LAN 1 controller by a process similar to the process of block 382. Of course, in bypass mode, processing will never reach this step, so step 400 is really only performed for a packet arriving from LAN 2 in bridge mode. Processing is then returned to the top of the bridge loop via path 402.

In other embodiments, the pointer addresses in the forwarding vector memory locations may be written at any time by the network manager.

In still other embodiments, where the isolate mode described above is implemented, the pointer addresses of both the LAN 1 and LAN 2 forwarding vectors will be set to point to a packet discard routine. In isolate mode, the switches controlling whether the LAN 2 interface (switch 151 in FIG. 2, switch 112 in FIG. 3 or switch SW1 in FIG. 6B) is driven by the LAN 2 controller, i.e., the bridge process or by the AUI port of the repeater, are set in the same position as they are set for bridge mode of operation.

Forwarding vectors are used in the preferred embodiment to increase the speed of processing of data packets. In an alternative embodiment, forwarding vectors may be eliminated and the steps of blocks 368 and 390 may be altered to read the configuration database to determine whether the hub/bridge is in bridge mode or bypass mode and then carry out appropriate processing to either discard the packet or forward the packet to the other network.

Referring to FIGS. 6A and 6B, there is shown in a block diagram of the preferred embodiment of an integrated hub/bridge. Two repeater/controllers 440 and 442, implementing an Ethernet data link layer communication protocol, drive a plurality of 24 port interface transceiver circuits indicated generally at 446, 448 and 449. These port interface circuits can be 10Base2, 10BaseT, 10BaseF or FOIRL specific. The physical media connected to the port interface circuits can be unshielded twisted pair, coaxial cable, fiber optic waveguide etc. Any data entering on any one of the 24 ports is automatically repeated by the repeater/controller chips 440 and 442 out on all the other ports. The repeater/controllers are also known as RICs in the trade. Data is transmitted from one repeater/controller to the other via an interRIC data bus 450 which is also coupled to a LAN 1 controller 452. In the claims appended hereto, this bus is referred to as the network one data bus. The 24 ports indicated at 446, 448 and 449 comprise local area network 1 for the bridge process.

Each of the repeater controllers 440 and 442 has a AUI output port indicated at 456 and 458. The AUI port 458 is coupled to a software controlled switch SW1 which selectively couples either bus 458 or bus 470 coupled to a LAN 1 controller 452 to a bus 462 depending upon whether the integrated hub/bridge is operating in bridge or bypass mode. The bus 462 can be selectively coupled by switch SW3 to either of two LAN 2 interface transceivers which drive the physical media of LAN 2. A switch SW2 selectively couples an AUI port 456 on RIC 440 to LAN 2 transceiver 464 in some embodiments. This allows the integrated hub/bridge to have two backbone ports operating simultaneously one of which is a repeater and one of which is bridged by proper settings of switches SW1, SW2, and SW3. Switches SW1 and SW3 can be software driven, manually operated or some combination thereof.

In bypass mode, at initialization time, switch SW1 is set by the microprocessor 460 to connect the AUI port 458 to bus 462. Switch SW3 is also set during initialization time to select either LAN 2 interface 464 or 466. In some embodiments, upon failure of one of the LAN interfaces 464 or 466, the microprocessor will automatically attempt failure recovery by changing the state of switch SW3 to select the other LAN interface so as to maintain communications with LAN 2 in either the bridge mode or the bypass mode.

If the user has selected bridge mode, during initialization time, the microprocessor will set switch SW1 to connect bus 470 to bus 462. This allows the bridge process performed by CPU 460 in software to drive the LAN 2 interface via a LAN 2 controller 472 for packets that need to be forwarded from LAN 1 to LAN 2 or vice versa. Incoming packets from LAN 2 will arrive via the selected LAN 2 interface 464 or 466 and will be transferred to the LAN 2 controller 472. The LAN 2 controller will then generate an interrupt to the CPU 460 and deposit the packet in dynamic random access memory (DRAM) 478 using DMA controller 480.

The bridging routine is embodied in a computer program which is stored in nonvolatile memory in the form of field erasable programmable read-only memory 490. This software also contains the initialization code which sets up the repeaters and sets the switch positions for bypass mode or bridge mode and writes the forwarding vector address pointers according to whatever mode is selected by the user.

The initialization routine in pseudocode is as follows:

```
If dynamic RAM test fails:
    Stop
Set up software environment
If non-volatile RAM (NVRAM) checksum is OK:
    Read system parameters from NVRAM
Else
    Reinitialize system parameters in NVRAM to defaults
Determine hub type from ID PROM
Select hub mode of operation (bypass or bridge)
Do preliminary configuration of RICs
If any network interface tests fail:
    stop
Initialize the I/O buffers and the bridging database
Do final hub/RIC configuration
Initialize the network interfaces (hardware)
Activate bridging
Initialize hub management agent
Start console command processor
```

The central processing unit 460 initializes the repeater/controllers using tristate buffers 500 and 502. These buffers are coupled to the data, address and control buses, 504, 506 and 508, respectively, of the CPU 460, and essentially serve multiplexer functions in multiplexing data, address and control information from buses 504, 506 and 508 onto 8-bit shared RIC buses 510 and 512 of repeater/controllers 440 and 442.

The repeater/controllers 440 and 442, in the preferred embodiment, are National Semiconductor 83950 Ethernet RIC's, and are intelligent in the sense that they can sense certain things about the data packets being received and transmit data regarding network traffic to the microprocessor 460. This feedback data from the RIC's is transmitted to the microprocessor through the LAN 1 controller 452.

In the preferred embodiment, a microprocessor 460 is used to implement the bridge function, do initialization and carry out management functions. This CPU is any one of the Motorola 680X0 series.

The repeater/controllers also drive twenty-four CRS light emitting diodes symbolized by block 514. These diodes flicker to indicate when there is traffic on their respective ports. There is one CRS diode for every port, and each individual diode is driven through addressing and multiplexing LED logic units 516 and 518. These logic units allow the eight-bit buses 510 and 512 to be shared such that the repeater/controllers can use buses 510 and 512 to drive the LED's 514, while the CPU can use these buses to initialize the repeater/controllers and to send management commands to them to turn on and turn off ports, etc.

The logic units 516 and 518 are also used to address and store data from the RICs in a polarity status register 520. It is possible to connect the physical media to the LAN 1 interface ports with reversed polarity. If this happens, that port will not work, and this information is of interest to the network manager. Therefore, the logic circuits 516 and 518 are also used to convey polarity status information from the repeater/controllers 440 and 442 to the polarity status register 520. The polarity status information is read by the microprocessor and conveyed to the network manager.

Nonvolatile random access memory 540 is used to store the configuration and status database information as symbolized by block 294 in FIG. 4.

A serial communications controller 542 and interface logic 544 are used to couple the hub/bridge circuit to an out-of-band management control device such as terminal 302 or modem 300 in FIG. 4. This allows management functions to be invoked by the network manager via a direct coupling to the hub/bridge.

An ID PROM 546 stores the data link layer address of the hub/bridge such that in-band management data packets may use this address as their destination address and be forwarded by the bridge process to the management queue in memory 478.

The microprocessor 460 controls twenty-four status LED's symbolized by block 560. These LED's are controlled through an enable LED register 562 and a disable LED register 564. These registers may be addressee by writing their addresses on the CPU address bus 506. This address is decoded by a address decoder gate array 566 which generates appropriate chip select signals to enable the appropriate chips which are to have a transaction with the CPU.

The status LED's have a color which indicates the status of each port. If a port is functioning correctly, its corresponding status LED will be green. The corresponding status LED will be red if any of three error conditions exist for the port. These three error conditions are: improper polarity, the port is partitioned, or there is no link pulse.

The status register 580 and the LED and command circuit 582 are used by the central processing unit to signal certain conditions relating to the status of the combined hub/bridge. Typically there are eight LED's in circuit 582, four of which are used to signal hub status and four of which are used to signal network status. The CPU controls these LED's by writing data into registers in the circuit 582. The four hub status LED's are used to indicate whether power is on, whether a fault has occurred, whether the hub is in bridge or bypass mode, and whether the physical media is connected. The four network status LED's are used to indicate when data is being received from local area networks 1 and 2 and when data is being transmitted on networks 1 and 2. Normally, the local area network controllers 452 and 472 control these network status LED's during fault free operation. However, when a fault occurs, the microprocessor 460 takes over control of these LED's and writes data to the circuit 582 to cause the LED's to light in a pattern which indicates the type of fault which occurred.

The DIP switches 584 are used to troubleshoot the hub/bridge system, to select between AppleTalk Phase 1 or Phase 2 and to flush the NVRAM.

Static RAM 586 is used to store parameters for the network.

LAN 1 utilization register 588 and LAN 2 utilization register 590 are used to store counts which indicate the volume of traffic flow on local area networks 1 and 2, respectively.

Since the dynamic random access memory 478 is shared between the local area network controllers 452 and 472 via the DMA circuit 480, and the microprocessor 460, the data, address and control buses of memory 478 must be multiplexed to implement this sharing. Likewise, the microprocessor must be able to write data to the local area network controllers at the outset to inform these controllers of the locations of the transmit and receive FIFO buffers which are established in memory 478. The microprocessor also stores the bridge forwarding tables in DRAM 478.

The data bus 504 of the microprocessor is coupled to the data bus 602 of the DRAM and the data bus of the local area network controllers by a tristate buffer 604. Data bus 602 is coupled to a shared data/address bus 606 of the DMA device 480 by a tristate buffer 608. The buffers 604 and 608 have their tristate status controlled by a bus grant programmable array logic 610. Three arbitration PALs 610, 612 and 614 are used to arbitrate requests for access to the data, address and control buses such that the DRAM 478 may be shared between the DMA controller 480 and the CPU 460. For simplicity, the connections between these PALs and the buffers and multiplexers they control are generally not shown.

The address bus of the DRAM 478 is multiplexed by an address multiplexer 616 which has as its two inputs the DMA address bus 618 and the CPU address bus 620. Tristate buffer 622, coupling the microprocessor address bus 506 to the address bus segment 620, is controlled by arbitration PAL 612 to isolate the CPU address bus 506 from the address bus segment 620 when the DMA address bus is active. Selection of the address input to apply to the DRAM address bus 630 is controlled by a programmable array logic 632.

Control signals from the DMA device on bus 634 and control signals from the CPU on bus 636 are coupled to the two selectable inputs of a control multiplexer/PAL 640. The MUX/PAL 640 also receives three control inputs from the control PAL 614, one of which controls selection of the particular control bus input to couple to the output bus 644. A portion of the signals on bus 644 are applied as input signals to the PAL 632 to control its state and two output signals from the address multiplexer 616 are also applied as inputs to this PAL 632. PAL 632 generates the row address strobe/column address strobe signal on line 648 to control whether the address on bus 630 to the DRAM is used to address a row or column. The PAL 632 also receives a refresh signal on line 650 from a timing circuit (not shown) which causes the PAL 632 to refresh the DRAM 478 at a 64-kilohertz rate. The PAL 632 also generates a handshake signal on line 652 to inform the control PAL 614 that a refresh cycle is under way and to not attempt to grant bus access to either the DMA control bus 634 or the CPU control bus 636 via buffer 637.

Finally, a tri-state buffer 660 is used to multiplex the data/high address bus 606 from the DMA device 480 such that when the DMA is granted access to the address bus of the DRAM, bus segment 606 is coupled to the low address bus segment 607 to form a 24-bit DMA address bus 618.

The control MUX/PAL 640 also generates a read/write control signal to the DRAM on line 680 to control whether the DRAM is reading or writing. The MUX/PAL 640 also generates a read/write control signal to the LAN controllers 452 and 472 to allow these controllers to be either written or read by the microprocessor 460.

The bus grant PAL 610, the arbitration PAL 612 and the control PAL 614 control the states of the PAL 632 and the buffers 604, 608, 660, 622, and 637 so as to time division multiplex or arbitrate the data, address and control buses such that the DRAM 478 may be shared. The details of this bus arbitration or multiplexing are not critical to the invention, and any other arbitration scheme known in the prior art may also be used and still be within the scope of the teachings of the invention. Further, in alternative embodiments, separate DRAM memories may be used for the local area network controllers, and the bridging process and for any other process which needs DRAM memory assigned to it such that bus arbitration can be simplified.

The program executed by the microprocessor 460, written in C source code and assembly language on an Apple MPW 3.0 development system, is attached hereto as Appendix A. The microprocessor 460 is a Motorola 68000 in the preferred embodiment, but other microprocessors in the 68000 series should also execute this code properly when compiled for their particular machine language. The actual schematic diagrams and PAL equations of the best mode of carrying out the teachings of the invention are included herewith as Appendix B and Appendix C.

Figure 7:
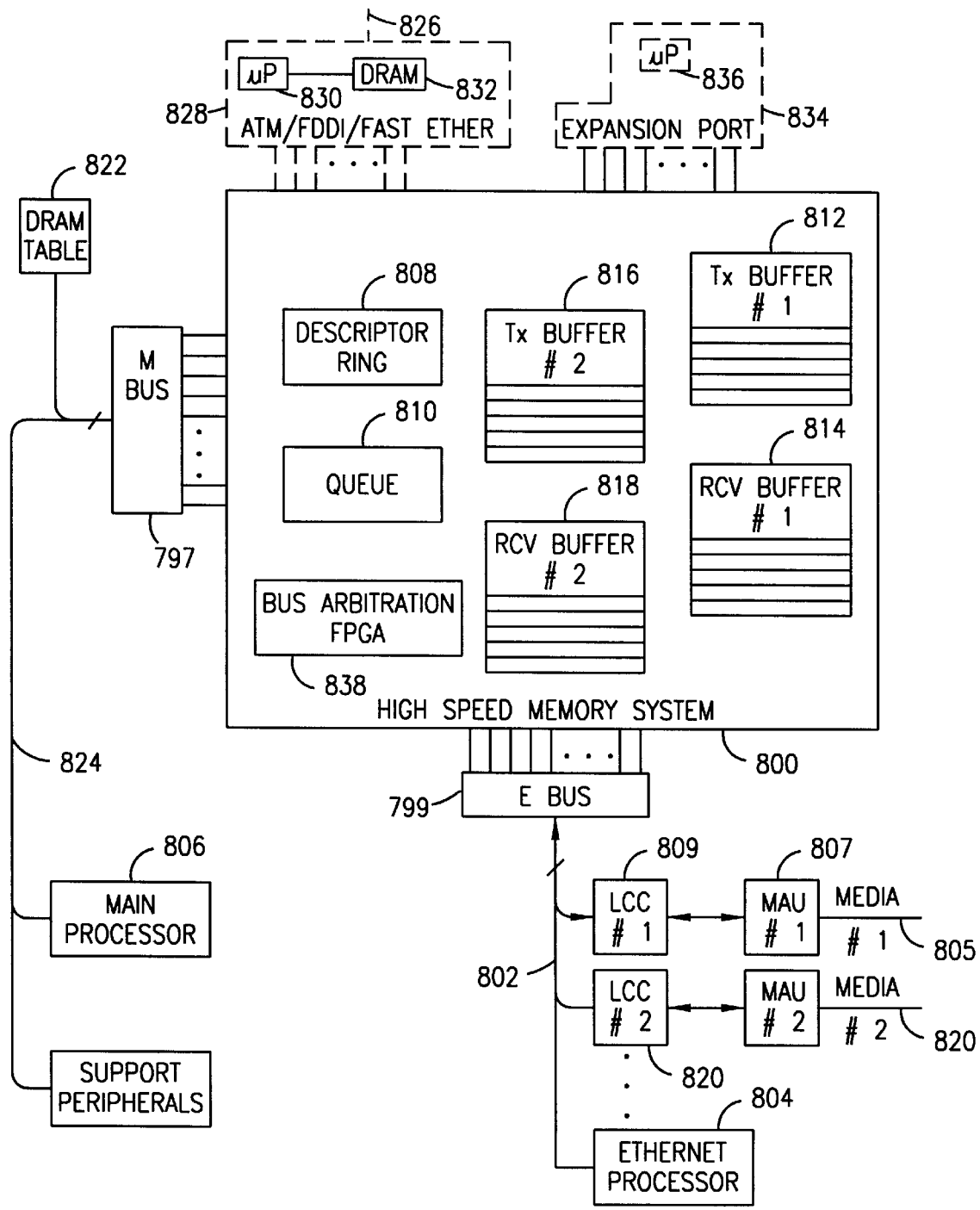
FIG. 7 is a block diagram illustrating an embodiment of a packet switching network hub.

Referring to FIG. 7, there is shown a block diagram of one embodiment of a different type of packet switching network hub apparatus than the combined hub/bridge described above. The apparatus is comprised of a high-speed, shared, mutiport memory system 800 which has two ports in this particular embodiment. One of the ports is coupled by an E bus 802 and an E bus driver circuit 799 to a plurality of conventional LAN controller chips, of which LCC #1 is typical. The LAN Controller Chips (hereafter sometimes referred to as LCC's) are available commercially from various suppliers like National Semiconductor of Santa Clara, Calif., and are sometimes also referred to as "Sonic" chips. Each LAN Controller Chip is coupled to its own Ethernet media segment via a Media Access Unit (hereafter MAU). Each Ethernet segment, such as segment 805 coupled to MAU 807 and LCC 809, typically has a 10 Megabit/sec data carrying capacity which is defined by the Ethernet standard.

The E bus 802 is also coupled to an Ethernet processor 804. The Ethernet processor 804 configures the LAN controller chips and creates in the high speed memory a separate transmit and receive buffer for each LAN controller and a separate area of memory for storing receive and transmit status data for each LAN controller, each separate area of memory storing status data being hereafter called a descriptor. In the particular class of embodiments symbolized by FIG. 7, the Ethernet processor 804 then assigns each LAN controller chip to a specific transmit buffer and a specific receive buffer in the high speed memory system 800, and these assignments are fixed and do not vary over time. In alternative embodiments to be described below, the Ethernet processor 804 allocates at least one receive buffer and one transmit buffer for each LCC, but the particular receive buffer in which is stored any particular packet being handled depends upon which buffers are free at the time the packet arrived. In other words a table of free receive buffers is kept and consulted when a packet arrives to find an open receive buffer in which to store the packet. In the preferred embodiment, each receive buffer is the same size, but in other embodiments, only enough memory is allocated for each packet as that particular packet needs for greater memory utilization efficiency at the expense of some processing power devoted to determining how much memory to allocate to each packet. Equal size buffers for all receive buffers increases data throughput by eliminating the need for processing to determine how much of the memory system to devote to each packet.

The Ethernet processor 804, in the class of embodiments represented by FIG. 7, creates the descriptors in the high speed memory 800 by assigning a unique range of addresses in the high speed memory 800 for the descriptor for Lan Controller Chip LCC #1 and another unique range of addresses for the descriptor for Lan Controller Chip LCC #2. These descriptors are then organized as a linked list by the Ethernet processor by writing as the last field (or some other predefined field in the descriptor space) a pointer to the start of the next descriptor. The pointer is the address in high speed memory where the descriptor for the next LAN controller starts.

The Ethernet processor 804 then assigns each particular LAN Controller Chip to a unique descriptor dedicated to supporting only that Lan Controller Chip (hereafter sometimes referred to as an LCC). The Ethernet processor 804 then assigns each LCC to unique transmit and receive buffers dedicated to supporting only that Lan Controller Chip. These two steps are done by informing each LAN Controller Chip of the range of addresses that comprise the descriptor for that LCC and the range of addresses comprising the receive buffer into which received data packets from that LCC are to be deposited. The Ethernet also informs each LCC of the address range in high speed memory 800 where each LCC can find data packets to be transmitted on the Ethernet segment connected to its corresponding MAU. In FIG. 7, transmit buffer 812 and receive buffer 814 are assigned to LCC 809, while transmit buffer 816 and receive buffer 818 are assigned to LCC 820. Each of LCC 809 and LCC 820 has a descriptor entry somewhere on the linked list symbolized by descriptor ring 808.

In alternative embodiments, the LAN controllers can have enough intelligence to coordinate with each other to assign their own descriptor memory spaces, and transmit and receive buffers thereby eliminating the need for a separate Ethernet processor 804. In another alternative embodiment, the LAN Controller Chips can have sufficient on-board memory to store incoming packets and status data and to temporarily buffer outgoing packets before they are transmitted. The central high speed memory class of embodiments symbolized by FIG. 7 is preferred however because LAN controllers with on-board memory would have to have enough memory to store a plurality of data packets in cases where the main microprocessor processing (to be described below in more detail) is too slow to take all packets as they are received. This could require too much memory and make the LCC's too expensive.

Returning to the consideration of the class of embodiments symbolized by FIG. 7, the individual transmit and receive buffers assigned to the LAN controller chips are located in an address space which is shared with a main microprocessor 806 which serves to do bridging and routing functions as will be described in more detail below.

Because each LAN Controller Chip has its own MAU, each of the LAN Controller Chips can be coupled to any type of Ethernet media. For example, LCC #1 may be connected through a 10BaseT type MAU to a twisted pair media segment 805, while LCC#2 may be connected through a 10Base2 type MAU #2 to a coaxial cable type media segment 820. Another LCC may be connected to a fiber optic backbone link etc. Each media segment such as segment 805 may be connected to a computer or other peripheral or it may be connected to a network input port of a hub or another switching apparatus such as the genus of apparati symbolized by FIG. 7. In the preferred embodiment, there are 12 LCC's, 12 MAU's and 12 media segments. Thus, as many as 12 LAN's could be connected together by the packet switching machine shown in FIG. 7.

Each LAN controller chip may be coupled to a computer or other peripheral via a particular LAN segment, or may be connected to another packet switching device or hub such that networks of very large size may be built as well as networks of smaller size.

After the buffers for LCC #1 are assigned to it, the Ethernet processor 804 turns on LCC #1 and it begins to listen for incoming data packets on media #1. The same scenario applies to each LAN controller.

When a packet starts arriving, the LAN controller chip connected to the network segment on which the packet is arriving asynchronously starts depositing data from the packet into the receive buffer assigned to that LAN controller. The LAN controller also accesses descriptor file assigned to it and writes status data thereto indicating that a packet is arriving. Typically, the LAN controller deposits the packet information in its receive buffer by performing a DMA transaction and then does a DMA access to the descriptor ring and sets a status bit indicating that the LAN controller is receiving a packet. However, mechanisms other than DMA may also be used in other embodiments such as conventional read and write transactions involving the Ethernet processor 804 to write the data to the main memory after the LCC generates an interrupt or upon the LCC being polled by the Ethernet processor 804.

After a LAN controller chip has received a complete packet, the LCC performs an error detection process on the packet. In some embodiments, the LCC may also correct any errors it finds within range of the ECC bits appended to the packet, and in other embodiments, the LCC may simply ask for retransmission.

Once the packet has been correctly received, the LCC does a DMA access to the descriptor buffer or record assigned to the LCC and sets a new status bit or changes the status bit previously accessed so as to indicate that a complete, correct packet has been received and is stored in the receive buffer of the LAN controller. In the preferred embodiment, the descriptor buffer for the LAN controller that received the packet will also be updated with a pointer to the address in the appropriate receive buffer where the data of the received packet starts.

The Ethernet processor 804 also functions to determine when complete and correct data packets have been received and then refers these data packets to the main microprocessor 806 for further processing. To perform this function, the Ethernet processor continuously polls the "descriptor ring" 808 to determine which LCC's have stored received packets that are ready for routing or other processing such as passing the packet to a management function. To do this, the Ethernet processor 804 reads the status bit or bits of each descriptor buffer in the descriptor ring linked list 808. When status data is detected in a particular descriptor buffer indicating that a complete and correct data packet has been received and is waiting in the receive buffer of a particular LAN controller associated with the descriptor in which the data was found. When the Ethernet processor determines from polling the descriptor rings that a particular LAN controller has successfully received a packet, the Ethernet processor writes a pointer to the received packet into queue 810 of high speed memory 800. The queue 810 serves as a sort of FIFO stack of pointers used to prioritize the routing, bridging and other processing functions of the main microprocessor 806. In the preferred embodiment, the Ethernet processor 804 retrieves the pointer to be stored in queue 810 from the descriptor buffer itself. In other embodiments, the Ethernet processor 804 learns of the presence of a packet in a receive buffer from data in the descriptor and then reads an on-board memory or register in the corresponding LCC to retrieve a pointer to the packet. This pointer is then stored in the processing queue 810 for the main microprocessor. The processing queue must be in a shared address space of both the Ethernet processor 804 and the main microprocessor 806.

The processing queue 810 is essentially a table in high speed memory 800. This table serves the function of providing an expandable buffer for pointers to received packets in case the rate at which packets are being received by the LCC's exceeds the rate at which these packets are being processed by the main microprocessor 806. The main microprocessor starts processing received packets using the pointer at the top of the table and continues to process packets having pointers stored in other locations in the table by sequentially retrieving the pointers stored in lower slots of the table until the bottom of the table is reached. The main microprocessor keeps track of its position in the table using a pointer which is moved to the next table location when a packet has been processed by the main microprocessor. When the bottom of the table is reached, the pointer is reset to the top of the table. Likewise, a pointer is used by the Ethernet processor 804 in filling the table, and when the bottom of the table is reached, the pointer is reset to the top of the table to start filling the table again from the top.

The Ethernet processor cannot reset its pointer to the top of the table until it is sure that the main microprocessor 806 has processed the packet pointed to by the pointer in the top of the table which is about to be overwritten. This can be done in several ways. For example, a bit reserved for "processesed/not processed status" in every table entry may be set by the main microprocessor 806 as a packet is processed. The bit would be set by the main microprocessor to a "processed" state whenever processing of the packet pointed to by the pointer in that table entry is complete. When this bit is found in the "processed" state, the Ethernet processor 804 would know that that table location is available for use in storing a pointer to a new packet awaiting processing. In another embodiment, the Ethernet processor 804 would simply compare its pointer position to the current pointer position for processing by the main microprocessor, and, if the main microprocessor's pointer was lower in the table than the pointer of the Ethernet processor, then the Ethernet processor is free to assume that all storage locations down to the position of the main microprocessor pointer are available for use in storing new pointers. In some embodiments, the queue 810 may be organized as a linked list. In such an embodiment, the easiest way to prevent overwriting pointers for packets that have not been processed is through use of a "processed/unprocessed" bit in each record in the linked list chain.

The main microprocessor 806 uses the pointers in queue 810 to access the received packets in whatever receive buffers they reside. The main microprocessor then looks at the addressing information in the packet header and decides what to do with the packet. The main microprocessor is responsible for doing bridging, routing, network management and possibly other miscellaneous functions. Some of the possibilities with regarding to handling a particular data packet by the main microprocessor are to discard the packet, transfer the packet to a management process or pass a pointer to the packet to a management process or bridge the packet to its destination on another media segment other than the one on which the packet arrived.

In the preferred embodiment, where a packet has to be bridged or routed by the main microprocessor and transmitted out on another media segment other than the one on which the packet arrived, the main microprocessor writes a pointer to the packet into the transmit buffer assigned to the LCC coupled to the media segment upon which the packet must be transmitted. In the preferred embodiment, the LCC's have sufficient intelligence to continually poll their transmit buffers. Any pointers in a transmit buffer will indicate the address in the receive buffer where the packet associated with that pointer can be found. When a pointer to a packet is found, the LCC uses the pointer to access the data packet from the receive buffer where the packet is stored and retrieves the packet. The packet is then transmitted. In some alternative embodiments, the main microprocessor may generate an interrupt signal or otherwise send a message to the LCC coupled to the media segment upon which a packet is to be transmitted when a pointer to the packet has been placed in the transmit buffer of that LCC. If a packet has not yet been transmitted, for example by LCC 809, and another packet arrives in the same or a different receive buffer which must also be re-transmitted on the media segment 805, the main microprocessor 806 places a pointer to that packet in the transmit buffer 812 in the next position that is unoccupied by other pointers therein.

To perform the routing, bridging and switching functions, the main microprocessor uses an 8000 entry routing, bridging and switching table stored in dynamic random access memory 822. The main microprocessor manages this table to implement a learning function similar to the bridge learning process described above for the network hub with integrated bridge.

The advantages of the packet switching structure shown in FIG. 7 over the network hub with integrated bridge are that many more local area networks may be connected together and the packet switching/bridging/routing functions are much faster. In fact, the switching/bridging and routing functions are performed at "media rate". For example, media segments such as segments 805 and 820, can each be receiving data at a rate of 10 megabits per second, the maximum allowable Ethernet rate of data transmission. If all 12 media segments are receiving data at that rate, the problem is to bridge, route and otherwise process all those packets without losing a packet. The class of embodiments symbolized by FIG. 7 can do this with the aid of the special memory structure shown. To handle the traffic volume mentioned above, extremely fast static random access memory having at least two and optionally 3 or 4 ports is used for high speed memory 800. To further speed up operations, data packets are not actually moved from the receive buffers to the transmit buffers to save the multiple memory cycles that would be required to do this. The only data that moves around the high speed memory are pointers to the data packets. In other embodiments where such high speed "media rate" operation is not required, the data packets themselves can be moved.

In the preferred embodiment, the high speed memory is designed to have three ports one of which is a high speed backbone interface. In a broader genus of the invention, this third high speed backbone port is omitted. In this genus, only two ports for the high speed memory 800 are needed. These two ports are coupled to the E bus 802 and the M bus 824. Like the E bus 802, the M bus 824 is coupled to the port of the high speed memory 800 through an M bus driver circuit. The third port to the high speed backbone, 828, is shown in dashed lines because it is optional. This port is actually an interface circuit to a very high speed backbone media 826 such as ATM, FDDI or Fast Ethernet. The ATM/FDDI/Fast Ethernet port 828 includes a microprocessor 830 that executes code stored in dynamic random access memory 832. The microprocessor 830 serves to convert the protocol used on the FDDI, ATM or Fast Ethernet media 826 to the protocol used on the regular Ethernet media such as media 805 and vice versa. The microprocessor 830 also stores any management packets arriving from the FDDI ring or other backbone media segment 826 in memory 832.

The fourth optional memory port is represented in dashed lines by expansion port 834. This interface circuit includes a microprocessor 836 which offloads part of the work of main microprocessor 806 is performing routing and management packet interpretation and execution of requested management functions.

Part of the high speed memory system is an arbitration circuit 838 that manages contention for the address and data ports of the memory chips that comprise the memory banks of the high speed memory system 800. The details of the arbitration circuit are not critical to the invention and can be conventional, but in the preferred embodiment, the arbitration circuit is implemented with a field programmable gate array. This FPGA has as outputs all the data, address and control lines of the static RAM chips in the memory system SIMM, and has as inputs all the lines of whatever number of ports are implemented in the memory system. The Boolean equations that define the logical relationships between the inputs and outputs is appended hereto as Appendix A.

The fundamental issue handled by the arbitration circuitry is handling conflicting memory access requests from the main microprocessor, the LCC chips and the Ethernet processor. In embodiments where there are also third and/or fourth ports, the arbitration circuitry also handles contentions for access to high speed memory from these interfaces as well. Collisions of access request can be resolved by conventional reservation schemes, contention resolution schemes, polling schemes, fixed time slots of fixed "pecking order" type schemes such as where a microprocessor having second position on a pecking order is granted access until a higher pecking order microprocessor requests access at which time the lower pecking order microprocessor must immediately relinquish control of the high speed memories address and data buses. The preferred methodology is the contention resolution scheme whereby one microprocessor desiring access is granted access for as long as the microprocessor needs access until another microprocessor requests simultaneous access at which time the conflict is resolved by any contention resolution scheme such as fixed priorities etc.

The amount of memory needed for high speed memory system 800 to only do Ethernet switching to bridge packets between the various media such as media 805 and media 820 with no backbone port 828 is one megabyte of 20 nanosecond access time SRAM. In this situation, maximum traffic volume situation is 6 Ethernet ports carrying inbound traffic and 6 Ethernet ports carrying outbound traffic. Such a situation would involve a maximum of 90,000 packets per second. To do this Ethernet-to-Ethernet switching coupled with FDDI switching requires that memory system 800 have two megabytes of of 20 nanosecond access time SRAM because approximately 150,000 packets per second need to be processed to achieve adequate performance levels. To do ATM switching requires that memory system 800 have four megabytes of 20 nanosecond access time SRAM. The required switching speed is achieved by having the memory system 800 be so much faster than the microprocessors such as Ethernet microprocessor 804 and main microprocessor 806 that it looks to the microprocessor like it has a piece of the high speed memory system 806 all to itself.

Typically, the receive buffer for each Ethernet media such as media 805 has 50 address locations, each of which can store one Ethernet packet of approximately 1,500 bytes length. If 12 Ethernet ports are all filling their buffers, practically all of one megabyte is filled. FDDI packets are longer however, being on the order of 4,500 bytes each. Therefore the addition of the FDDI adapter circuit 828 requires additional memory to support the longer length packets and higher traffic volume. ATM packets are only 53 bytes long, but these packets get concatenated. Also, ATM backbones require additional memory to support emulation mode where all the ATM network is made to look like an Ethernet to machines wishing to communicate over the ATM network.

The genus of packet switching machines represented by FIG. 7 is substantially faster and therefore better than other prior art packet switching technologies using high speed buses and buffer copy operations. Typically, these prior art packet switching machines use a single high speed bus to which are coupled a plurality of adapter circuits that couple the bus to each of a plurality of media such as Ethernet 10BaseT etc. When a packet is received on a first media, the packet is copied into a buffer memory on the adapter circuit coupling that media to the high speed bus. If the packet is addressed to a location on another media, the entire packet needs to be copied into the buffer of the adapter circuit coupled to the media on which the destination address resides (hereafter the target buffer). The packet is then copied out of the target buffer by the circuitry that drives the packet data onto the media to which the machine having the packet's destination address is coupled. This buffer copy operation is done using the high speed bus, but the very act of having to copy the entire packet from one buffer to another and having to do that with all the packets that need to be bridged from one media segment to another substantially slows down the operation of these prior art packet switching machines.

Another way in which switching speed is increased in the machines of the genus represented by FIG. 7 is through use of a "cut through" mode. The above described mode of operation of receiving an entire packet, error checking it and then notifying the main microprocessor of the existence and location of the packet so the main microprocessor can start examining the packet and take appropriate action will be hereafter referred to as the "store and forward" mode. The "cut through" mode is faster than the "store and forward" mode for the following reasons. In cut through mode, instead of waiting for the entire packet to be received and placed in the receive buffer before notifying the main microprocessor, the main microprocessor is notified of the existence of the packet after only the header is received. In other words, when a packet starts arriving on any particular media, the bytes of the packet header are sequentially stored in the receive buffer assigned to the media upon which the packet is arriving. After the complete header has been received, the Ethernet microprocessor notifies the main microprocessor of the existence and receive buffer location of the header of packet currently being received and requests that the main microprocessor start processing the packet. The main microprocessor then accesses the header and makes a determination of what kind of a packet it is, i.e., whether it needs to be routed to the management process or is a data packet, and whether the packet needs to be routed or bridged. If the packet needs to be bridged or routed to another media, the main microprocessor then notifies the LCC or adapter circuit coupled to the media to which is coupled the machine having an address corresponding to the destination address of the packet. That LCC or adapter circuit then begins sequentially emptying out the bytes of the packet from the receive buffer in which it is stored using a pointer to the start of the packet received from the main microprocessor. During all this processing the bytes of the incoming packet are being constantly received and stored in the receive buffer even as bytes earlier received are being emptied out of the same receive buffer by the LCC or adaptor circuit coupled to the media coupled to the destination machine.

After the incoming packet has been completely received, the LCC that deposited the bytes of the packet into the receive buffer checks the complete packet for errors such as a framecheck error. If there were errors, the packet that contained the errors will be discarded, and the system falls back to the "store and forward" mode. The reason that the system falls back to the "store and forward" mode is because there is probably some source of noise that the network is picking up that corrupted the packet just received and this source of noise is likely to have corrupted more than one packet. Therefore, since the portion of the corrupted packet just received which has been transmitted on the destination machine's media cannot be retrieved, to avoid further erroneous packets from being propagated onto other media, the system falls back to the "store and forward" mode. In this mode, the main microprocessor is not notified that a received packet exists and needs to be processed until the entire packet has been received and has been checked for errors and found to be error-free.

If no errors were found at the end of the packet reception in the "cut through" mode, the system continues in the cut through mode for all received packets to achieve maximum throughput. Generally, it has been found that Ethernet networks are so reliable that the cut through mode can be used most of the time with error-free operation.

In alternative embodiments where speed is not so critical, the main microprocessor may move the packet out of the receive buffer for the LCC of the media segment upon which the packet arrived and moves it to the transmit buffer assigned to the LCC coupled to the media segment upon which the packet is to be transmitted.

In the preferred embodiment, the LCC that ultimately transmits the packet will, upon successful completion of the transmission, set a bit in its descriptor indicating that the packet has been successfully transmitted. Then, either the Ethernet processor or the main microprocessor 806 will access the packet that has been transmitted and erase it from the receive buffer. The packet may not be literally erased in some embodiments. The addresses which the packet occupied may simply be indicated as available in a table kept in high speed memory 800 or on-board one of the microprocessors 804 or 806. This memory management process to keep track of available memory may be done by the main microprocessor 806 or the Ethernet processor 804, or, in some embodiments, by the LCC chips themselves.

A key aspect of the invention is design of a high speed memory system which has sufficient bandwidth, i.e., low enough access times and enough throughput so as to be able to accept up to 10 megabits/second traffic volume on each network media coupled through a MAU and LCC to the E bus so as to be able to receive at least 120 megabits/second on the aggregate over the E bus and route this traffic to the high speed backbone port at media rate while having enough memory bandwidth left over to allow the two or more microprocessors in the system to still be able to have access to the high speed memory for purposes of executing their programs without constriction. Media rate for both FDDI and Fast Ethernet are 100 megabits/second, and media rate for planned ATM systems is 155 megabits/sec. In the preferred embodiment, the bandwidth of the high speed memory is 1.2 gigabits/second. This aspect of the teachings of the invention is accomplished by making high speed memory a shared static RAM array which has multiple ports and bus arbitration for access from the multiple ports to the shared address, data and control lines of the memory chips themselves.

Figure 8:
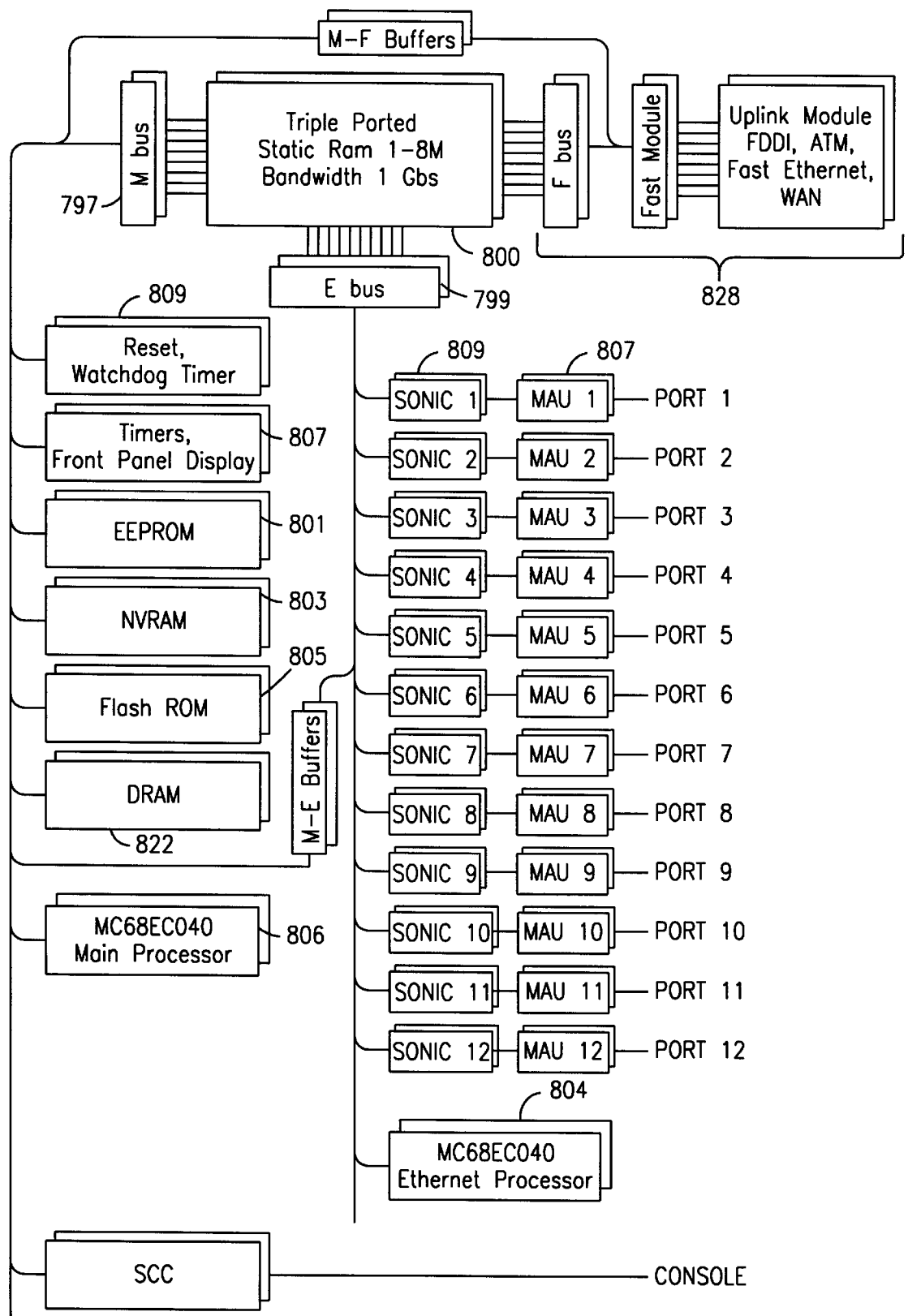
FIG. 8 is a block diagram illustrating a species of machines built in accordance with and operating in accordance with the present invention.

Referring to FIG. 8, there is shown a more detailed block diagram representing a species of machines built in accordance with and operating in accordance with the genus of the invention. The LCC's of FIG. 7 such as block 809 correspond to Sonic chips marked Sonic 1 through Sonic 12. The MAU chips of FIG. 7 such as block 807 are represented by blocks MAU 1 through MAU 12. The Ethernet media such as media 805 are represented by the lines marked Port 1 through Port 12. The Ethernet processor 804 is implemented by a Motorola MC68EC040 microprocessor and the main processor 806 is also implemented by a Motorola MC68EC040 microprocessor. In an alternative embodiment, the functions of the main processor 806 and the Ethernet processor 804 could be combined and performed by a single more powerful processor such as the PowerPC RISC microprocessor, a Pentium microprocessor etc. It is preferred to use two microprocessors however so that load sharing can be accomplished to increase data throughput and performance of the system. The main microprocessor 806 stores data comprising its bridging and routing tables in dynamic random access memory 822 or in SRAM 800. Factory configuration and manufacture data is stored in EEPROM 801. This data is not accessible to the user and consists of serial number, board revision level, software version number, date of manufacture, configuration data. Nonvolatile RAM memory 803 stores user programmable configuration data such as at what baud rate the ports work, what addresses have been assigned and other things that are user configurable. Flash ROM 805 stores the programs for the main processor 806 and the Ethernet processor 804 that are listed in Appendix E, Parts I and II. Timers and front panel display circuits 807 are used in support of the user interface and management functions. Reset and watchdog timer circuit 809 resets the microprocessors when a system crash occurs so that the microprocessors clear themselves and start again at the top of their program loops. The SCC circuit is a serial communications controller for bidirectionally communicating data between the packet switching machine and the console. The circuitry of FIG. 8 is programmed to operate in the fashion described in FIGS. 9, 10A and 10B and 11.

Figure 9:
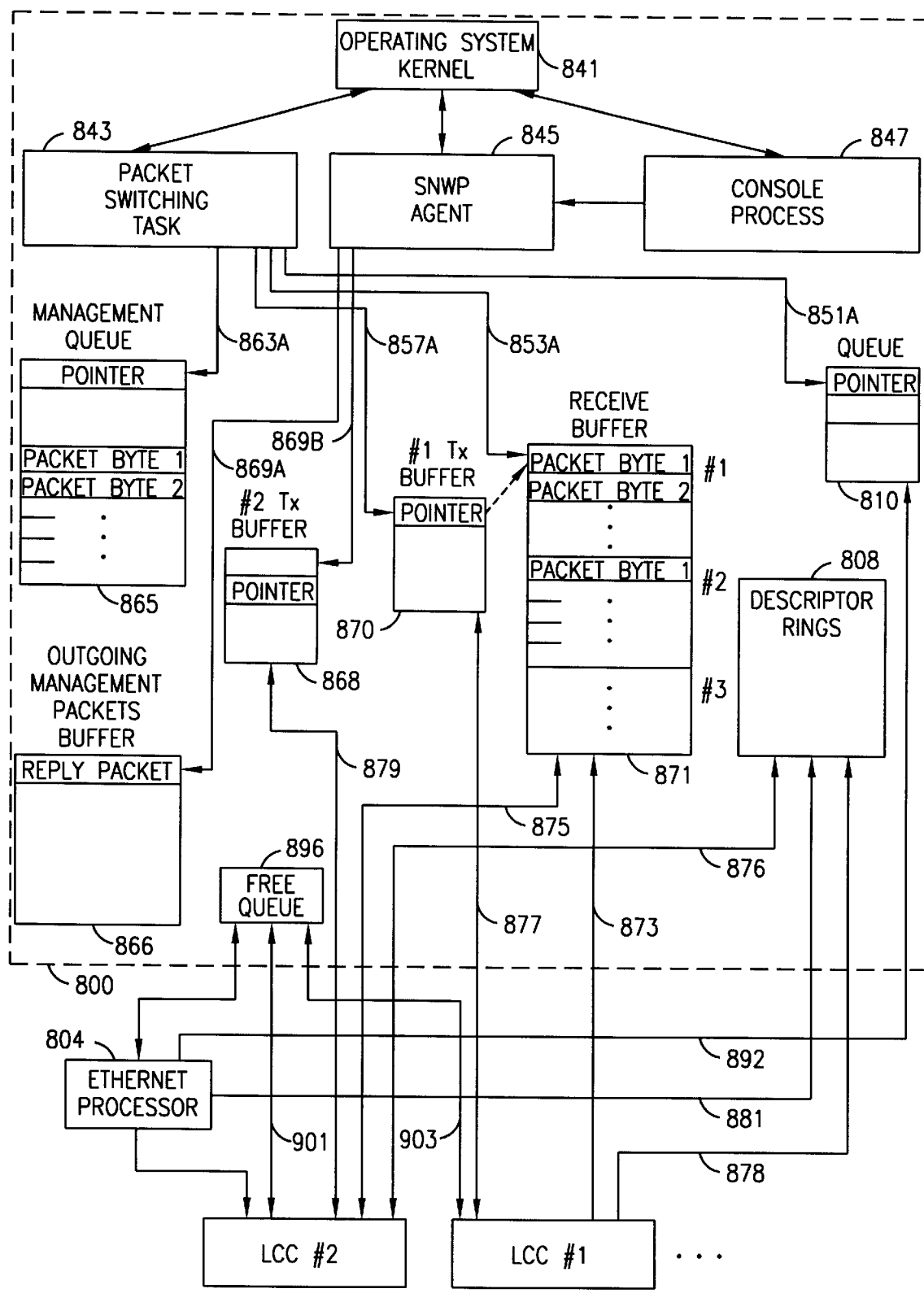
FIG. 9 is a block diagram illustrating the process carried out according to the present invention.
Figure 10A:
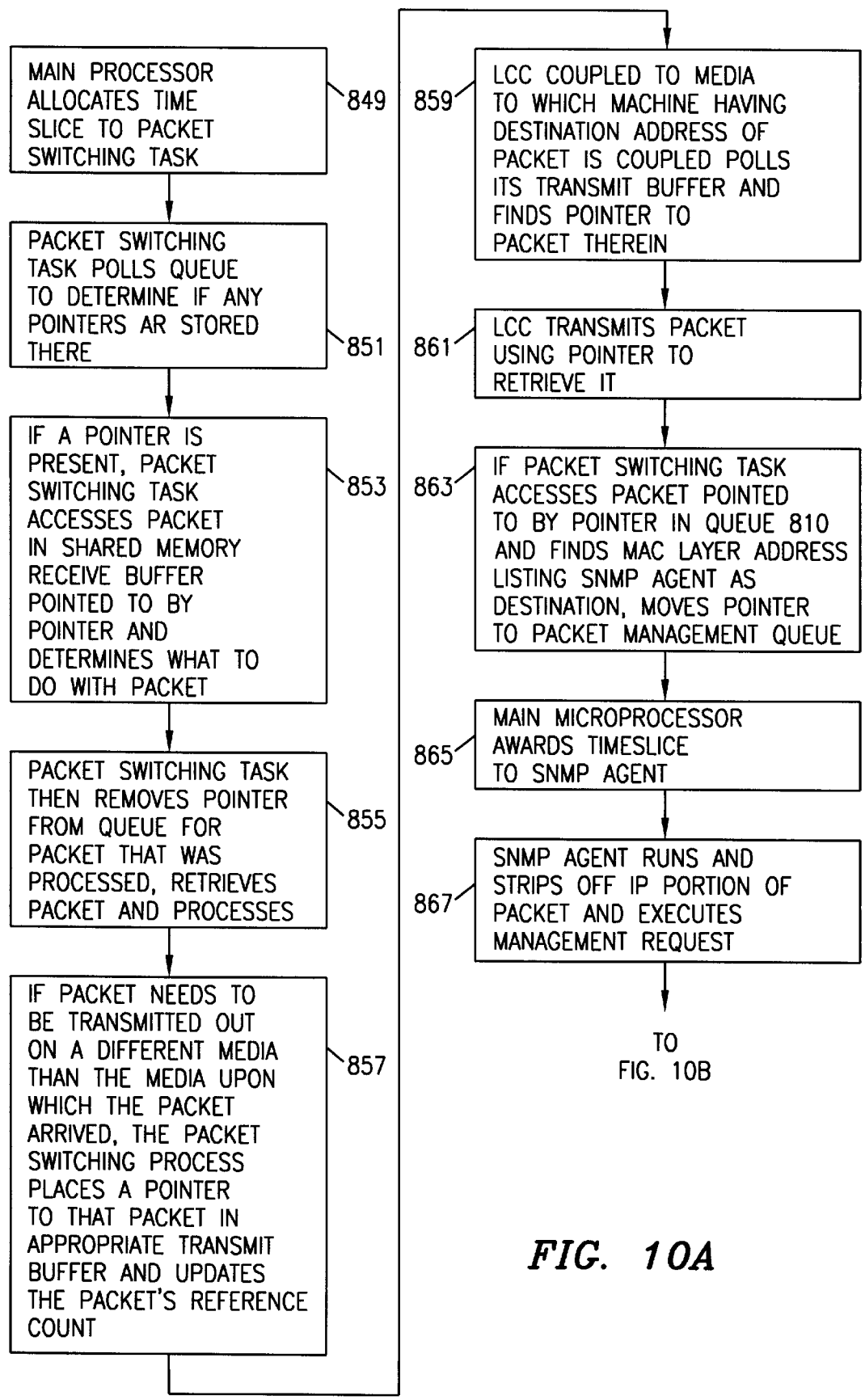
FIG. 10a is a more detailed block diagram illustrating the operation of FIG. 9.
Figure 10B:
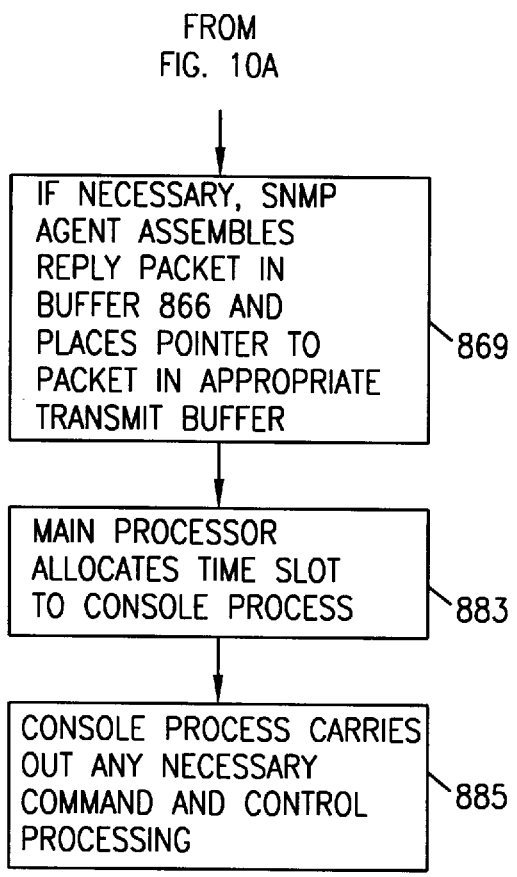
FIG. 10b is a block diagram illustrating the process carried out by the main microprocessor shown in FIG. 9.

Referring to FIG. 9, there is shown a conceptual diagram of the process carried out according to the teachings of the invention. The diagram of FIG. 9 assumes that the process is being carried out by an Ethernet processor and a main processor, although, it could be also carried out by a single processor doing the functions described for both the Ethernet processor and the main processor. FIG. 10, comprised of FIGS. 10A and 10B, is a flow chart of the general sequence of events in the handling of a jacket in the store and forward mode. The reader should refer to FIGS. 9 and 10 jointly for purposes of the following discussion. References to a main processor and an Ethernet processor should be read as references to a single processor where single processor structures are being used to carry out the process of FIG. 10. The operating system kernel, block 841 is executed by the main processor 806 (not shown). A function of the kernel is to implement a round robin, time slot based sharing of processor power among three tasks. Those three tasks are represented by block 843 for the Packet Switching Task, block 845 for the SNMP or Simple Network Management Protocol agent and block 847 for the Console Process. The operating system kernel, the Packet Switching Task, the SNMP agent and the Console Process are all programs or suites of programs which control operations of the main microprocessor during their respective time slots or in any other manner such as polled (kernel polls tasks and awards control of buses and main microprocessor assets when a task says it has business to transact), on demand (kernel awards control of buses and main microprocessor assets when receives request from task) etc. Each of these three processes gets awarded a 100 millisecond time slot by the kernel to perform its task and can perform its task to completion or until the end of 100 milliseconds, whichever occurs first. The kernel 841 may also provide functions that may be invoked by each of the three tasks to assist them in performing their tasks such as "read shared memory" or "write shared memory" etc.

In alternative embodiments, each task could be running simultaneously on its own microprocessor or each task could set a flag or generate an interrupt when it needs attention from the main processor so that processing by the main processor is allocated to tasks only when they ask for it. Obviously, the three tasks 843, 845 and 847 could also be implemented fully in hardware for even higher operating speeds or partially in hardware and partially in software.

Block 849 In FIG. 10A represents the award of a 100 millisecond timeslot to the Packet Switching Task by the main processor in the preferred embodiment. For purposes of FIG. 10 and illustration of the flow of processing, it will be assumed that each of the three tasks 843, 845 and 847 will have some processing needs during their respective time slots, and these processing needs will be handled sequentially.

During the time allocated to the packet switching task 843, the Packet Switching Task polls queue 810 in shared memory to determine if any pointers to packets to be processed are waiting therein, as symbolized by block 851 in FIG. 10A. If there is a pointer to a packet waiting in some receive buffer, the switching task accesses the appropriate receive buffer, indexes into the header information and examines the header data. This examination of the header data tells the Packet Switching Task whether the packet is to be discarded, transmitted out on another media (a media will sometimes hereafter be referred to as a port) from the one the packet arrived on, routed to the SNMP agent etc. This processing is represented by block 853 in FIG. 10A. The Packet Switching Task then takes the pointer off the queue 810, as symbolized by block 855, and processes the packet pointed to by that pointer accordingly, as symbolized by block 855. The packet may be a management packet that needs to be directed to the SNMP agent. Blocks 863 and following explain how this process works. Alternatively, the packet being processed by the main microprocessor may be a data packet that needs to be transmitted out a different port to another machine. Block 857 in FIG. 10A represents a bridging process to handle this type packet where a packet arrives from a first machine on one port or media and must be retransmitted via another port or media to a different machine. To implement this process, and as symbolized by block 857, the Packet Switching Process places a pointer to the packet in the appropriate transmit buffer assigned to the LCC coupled to the media or port upon which the packet is to be retransmitted, as represented by path 857A in FIG. 9, and updates the packet's reference count. Updating the reference count involves the main microprocessor writing a reference count number into a reference count field in the packet stored in the receive buffer. This reference count number is equal to the number of transmit buffers in which a pointer to the packet has been stored thereby indicating how many ports on which the packet is to be transmitted. This reference count is used to aid in managing the memory useage of the receive buffer for maximum utilization, especially in situation where some ports have heavy traffic or bottlenecks and packets are piling up while other ports are able to transmit their packets without delay as soon as pointers thereto are placed in their transmit buffers. Without the reference count and the Free Queue buffer, individual dedicated blocks of memory would have to be allocated to each LCC for its transmit and receive buffer as in the embodiment of FIG. 7. This does not result in optimum utilization of memory locations of the shared memory 800.

In the specific example diagrammed in FIG. 9, it is assumed that the packet is to be retransmitted to some machine coupled to media/port 1, so the pointer to the packet is placed in the transmit buffer 870 for port 1. This in effect triggers the appropriate LCC to begin transmitting the packet since the LCC's regularly poll their transmit buffers, as symbolized by block 859. The transmit buffer is a queue that is assigned to the LCC during the initialization process by the Ethernet processor. The LCC knows exactly where to look in the shared memory when it polls its transmit buffer as the addresses included within the transmit buffer assigned to any particular LCC do not change. Block 857 also represents the process carried out by the main microprocessor in carrying out the process of assisting in freeing the memory locations in the receive buffers for re-use in storing new incoming packets. To carry out this process, the main microprocessor, after processing a received packet by transferring it to the SNMP agent by placing a pointer to it in the management queue 865 or placing a pointer to the packet in some transmit buffer, also places a pointer to the packet in a free queue 896. The free queue is used to store pointers to packets that have been scheduled for transmission by the main microprocessor. Another function of the Ethernet processor 804 is to poll the free queue 896 periodically and use the pointers stored therein to free for re-use the memory space consumed in the receive buffer(s) by packets pointed to by pointers in the free queue.

If a pointer is found in the transmit buffer, the LCC transmits the packet using the pointer to retrieve the bytes of the packet from the receive buffer of the LCC which received it where the packet is stored, as symbolized by block 861. The data communication paths in FIG. 9 implementing this transaction are symbolized by paths 851A, 853A and 857A corresponding the steps having like root reference numbers in the flow chart of FIG. 10A.

Of course, some packets need to be broadcast or multicast. This is determined from the header addressing information. If a packet is to be broadcast, a pointer to the packet is placed in every transmit buffer, whereas if a packet is to be multicast, a pointer to is placed in all the transmit buffers coupled to media or ports having machines coupled thereto having destination addresses in the range given in the multicast address.

Assume for the next part of the discussion that a packet has arrived that is a management packet, and is sitting in the receive buffer of the LCC that received it. Whenever the management packet has been completely received, the Ethernet processor 804 places a pointer to it in the queue 810. Then, the next time the Packet Switching Took runs, the main processor will see the pointer to the management packet in the queue and examine the MAC layer address and realize that the packet is a management packet because the MAC layer address will indicate the SNMP agent 845 as the destination. The Packet Switching Task then places a pointer to the management packet in a portion of a management queue 865 in FIG. 9 devoted to pointers to management packets. Then the pointer to the management packet is removed from queue 910. All this processing 13 symbolized by block 863 in FIG. 10A and paths 851A, 853A and 863A in FIG. 9.

Block 865 in FIG. 10A, represents the process carried out by the main microprocessor in allocating a time slice to the SNMP agent/process 845 in FIG. 9. The SNMP agent block 846 really represents an SNMP agent as well as a stack of IP protocols that serve to decode the IP portion of the address of the packet and strip off the portions of the address that will not be understood by the SNMP agent. The remaining portion of the packet, which will be referred to as the management portion of the packet, is forwarded to the SNMP agent for execution. The SNMP agent 846 in FIG. 9 then executes whatever request is embodied in the management packet. Such requests could include enabling or shutting down a port, reconfigure a port, gather traffic information etc. All management packets will come in through one of the ports from an external source. All this processing regarding receiving the management packet and getting it to the SNMP agent is symbolized by block 867 in FIG. 10A.

If the management packet requests information, the SNMP agent gathers that information and assembles a reply packet in an outgoing management packet reply buffer 866 in FIG. 9 as symbolized by block 869 in FIG. 10B and path 869A in FIG. 9, Block 859 in FIG. 10B also represents the process of placing a pointer to the management reply packet into the appropriate transmit buffer, as symbolized by path 869B in FIG. 9. In this hypothetical, it is assumed that the reply packet is to be sent to some machine coupled to port/media 2 since the pointer to the reply packet is placed by the SNMP agent into the #2 transmit buffer 868. After the pointer is placed in the transmit buffer for the appropriate port, the LCC assigned to that port will find the pointer in its transmit buffer during polling thereof and begin tranmitting the packet.

The Etherenet processor 804 in FIG. 1 is assigned to allocate memory in the shared, multiport, high-speed memory 800 for the receive buffer 871 and to program the LCC's so that they know where their respective portions of the receive buffer 871 are located. In the preferred embodiment shown in FIG. 9, only one block of memory is allocated for the receive buffer 871, and each LCC uses whatever portion of this block is indicated to be free by data stored in a Free Queue 896 to be discussed further below. The embodiment of FIG. 9 differs from the embodiment of FIG. 7 in that in FIG. 7 there is a dedicated block of memory for the receive buffer and the transmit buffer for each LCC. The paths in FIG. 9 representing storage of received packets in the receive buffer 871 by LCC's #1 and 2 are paths 873 sand 875. To store a received packet in the receive buffer 871, the LCC consults the Free Queue 896 to determine which portions of the receive buffer are free, and then stores the packet therein. The paths in FIG. 9 representing consulting the Free Buffer 896 for the location of free memory space by the LCCs are 901 and 903. The paths representing polling of the transmit buffers are 877 and 879 in FIG. 9.

Block 883 in FIG. 10B represents the process carried out by the main microprocessor under control of the operating system kernel of awarding a timeslot to the console process 847 in FIG. 9. Block 885 then represents the process carried out by the Console Process driving the main microprocessor to carry out any necessary or requested command and/or control operation.

Figure 11:
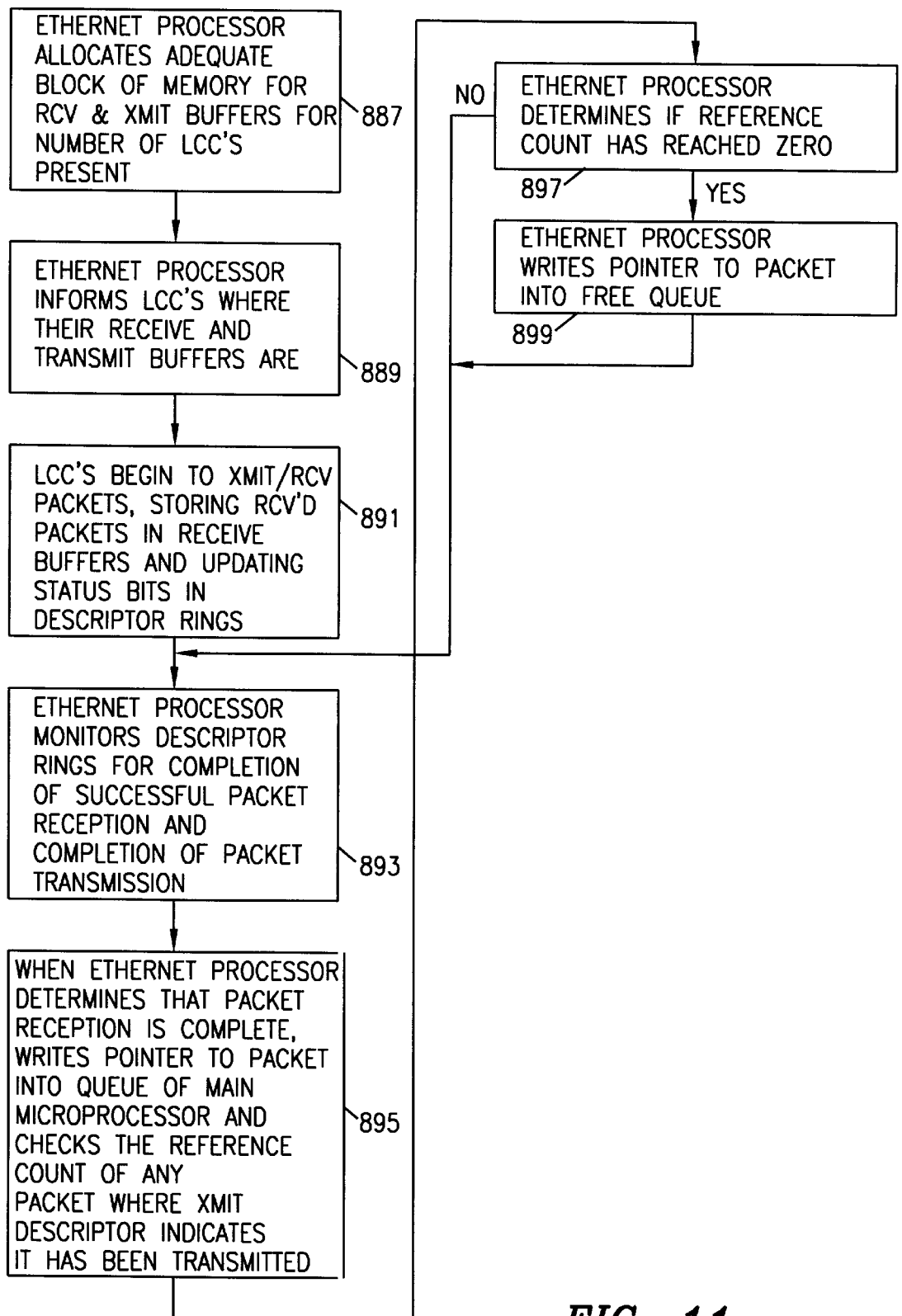
FIG. 11 is a block diagram illustrating a flow chart of the process carried out by the Ethernet processor of FIG. 9.

Referring to FIG. 11, there is shown a flow chart of the processing carried out by the Ethernet processor 804. The first task to be performed is represented by block 887. This block represents the process wherein the Ethernet processor allocates an adequate block of memory to accomodate both receive and transmit buffers for the number of LCC's present. In some embodiments, the Ethernet processor determines the number of LCC's present and actually connected to media before allocating memory for the buffers, and, in other embodiments, the Ethernet processor assumes that the number of LCC's present and connected to media is constant, and allocates memory adequate for receive and transmit buffers for all the LCC's. Next, in block 889, the Ethernet processor informs the LCC's where their transmit and receive buffers are in memory. This can be done by, for example, writing length information and pointers to the start of the transmit and receive buffer for each LCC in the descriptor ring for that LCCI. The LCC's then find out where their buffers are and the size thereof upon regular polling of their descriptor rings. Alternatively, the Ethernet processor can send messages directly the LCC's telling them the locations and sizes of their respective buffers.

Block 891 represents the process carried out by the LCC's in doing the following things: receiving packets and storing them in their respective receive buffers, transmitting packets pointed to by pointers in the transmit buffers of the LCCs, updating the packet reception status bits in the receive portions of their descriptor rings when packet reception starts and when it is completed, and updating status bits in the transmit portions of the descriptor rings each time a packet has been completely transmitted. These operations are symbolized by paths 873, 875, 876 and 878 in FIG. 9.

Block 893 represents the process carried out by the Ethernet processor 804 of monitoring the receive portions of the descriptor ring 808 for completion of successful packet reception and monitoring the transmit portions of the descriptor ring to determine when transmission of packets by each LCC has been successfully completed. These operations are symbolized by path 881 in FIG. 9. The descriptor rings 808 are portions of shared memory 800 which are used by the LCC's to store pointers to their receive and transmit buffers, CRC error and collision information, and bits, the logical state of which indicate when packet reception is starting and when it is finished and when transmission of a packet pointed to by a pointer in the transmit buffer of that LCC has been completed.

When the Ethernet processor finds a status bit in a receive portion of the descriptor ring in a state indicating that packet reception has been completed and the packet is correct, the Ethernet processor determines where the packet is in the receive buffer of the corresponding LCC and then writes a pointer to the location of that packet in the receive buffer 871 into the queue 810 of the main microprocessor, as symbolized by block 895. This transaction is represented by path 892 in FIG. 9. This function of the Ethernet processor essentially multiplexes the status bits of the 12 descriptor rings into a single location (queue 810) that the main microprocessor polls so that the main microprocessor does not have to poll 12 different descriptor rings itself. In alternative embodiments, the main microprocessor could poll all 12 descriptor locations on the descriptor linked list or ring itself and then locate the received packets in the receive buffers of any LCC's that have set status bits in their descriptor rings that indicate that a packet has been successfully received. In another embodiment, the descriptor ring could be a table instead of a linked list.

Block 895 also represents the process that the Ethernet processor performs when monitoring of the transmit portions of the descriptor ring indicates that a packet has been successfully transmitted, the Ethernet processor must determine whether the packet has been transmitted by all LCC's scheduled by the main microprocessor to send the packet before the Ethernet processor can mark that packet's storage locations as available to store new incoming packets. To do this, the Ethernet processor examines the reference count of the packet. This is done as follows. When the Ethernet processor discovers through monitoring the transmit portions of the descriptor ring that a packet transmission has occurred, the Ethernet processor reads the pointer to the packet in the transmit buffer of the LCC which indicated it had transmitted the packet. The Ethernet processor then marks that location in the transmit buffer as available to store another pointer, and uses the pointer to access the packet. A specific field at the beginning or end of the packet stores a reference count. This is a number stored there by the main microprocessor which indicates how many ports on which the packet is scheduled to be transmitted. When the Ethernet processor determines from the descriptor ring that the packet has been successfully transmitted, the Ethernet processor reads the reference count and decrements it by one.

Block 897 is then performed by the Ethernet processor to determine if the reference count has reached zero. If not, processing returns to block 893 to continue monitoring the descriptor ring. If so, processing proceeds to the process of block 899 to mark the storage locations occupied by the bytes of the packet as available for storage of new packets. In carrying out this process, the Ethernet processor writes a pointer to the packet just transmitted into the Free Queue 896. As a result, the Free Queue serves as a map of all available memory storage locations in receive buffer 871. This permits optimum utilization of the storage capacity of the block of memory reserved for the receive buffer over the embodiment symbolized by FIG. 7 since some receive buffers will empty faster than others because of bottlenecks or high traffic volume on particular ports causing slower rates of transmission of packets out that port. Typically that will happen on ports coupled to servers or serving as backbone connections to hubs coupled to other high volume networks.

In the embodiments of FIG. 9, the receive buffer is comprised of a plurality of fixed size blocks of memory which are each large enough to store at least one packet of the maximum allowable length defined by the TCP/IP protocol. The pointers in the Free Queue therefore do not need to include length information and only need to point to the starting address of one of the blocks of predetermined length in the receive buffer. Because these fixed length blocks make programming simpler and the program executes faster, this approach represents a tradeoff of memory inefficiency for increased performance. Because some packets are smaller than the maximum allowable length, more efficient use of the memory could be made if the pointers in the Free Queue included both a starting address to the free block as well as the length of the block. In such an embodiment, there would be no blocks of predefined length, and each received packet would consume as much of the receive buffer as it needed. In such an embodiment, all pointers to packets would include both the starting address of the packet in the receive buffer as well as its length. This approach yields greater memory efficiency at the expense of performance.

Of course, in another alternative embodiment, the functions of FIGS. 10 and 11 could all be performed by a single microprocessor. Arbitration of contention for the ports of the shared high speed memory is accomplished in the subgenus of embodiments represented by FIGS. 8–11 in the same manner as it was accomplished in the subgenus of embodiments represented by FIG. 7. Specifically, a field programmable gate array (not shown) like FPGA 838 in FIG. 7 can be included as part of the high speed memory system and used to monitor for contention on the address, data and control pins of the memory chips in the high speed memory and award control thereof to one of the microprocessors.

DUAL PASSWORD SECURITY FEATURE

The following feature is applicable not only to provision of security for the configuration and password data on the hub with integrated bridge and packet switching machines disclosed here, but to any other password protected hardware or software system as well. However, the discussion herein will be limited to protection of the hub with integrated bridge.

Generally speaking, the double password security feature allows a user or network administrator to set and alter configuration data using his or her password, but requires that a second user correctly enter a second password in order for the network administrator to alter his or her password. This prevents a network administrator who is being terminated from entering the system, shutting off the ports, changing user privileges or otherwise rendering the system less useable or inoperative and then changing his or her password unbeknownst to other employees so those other employees cannot get the system properly reconfigured after the network administrator is terminated. In some embodiments, the second employee cannot have access to the privilege and configuration data through the second password gateway.

Figure 12:
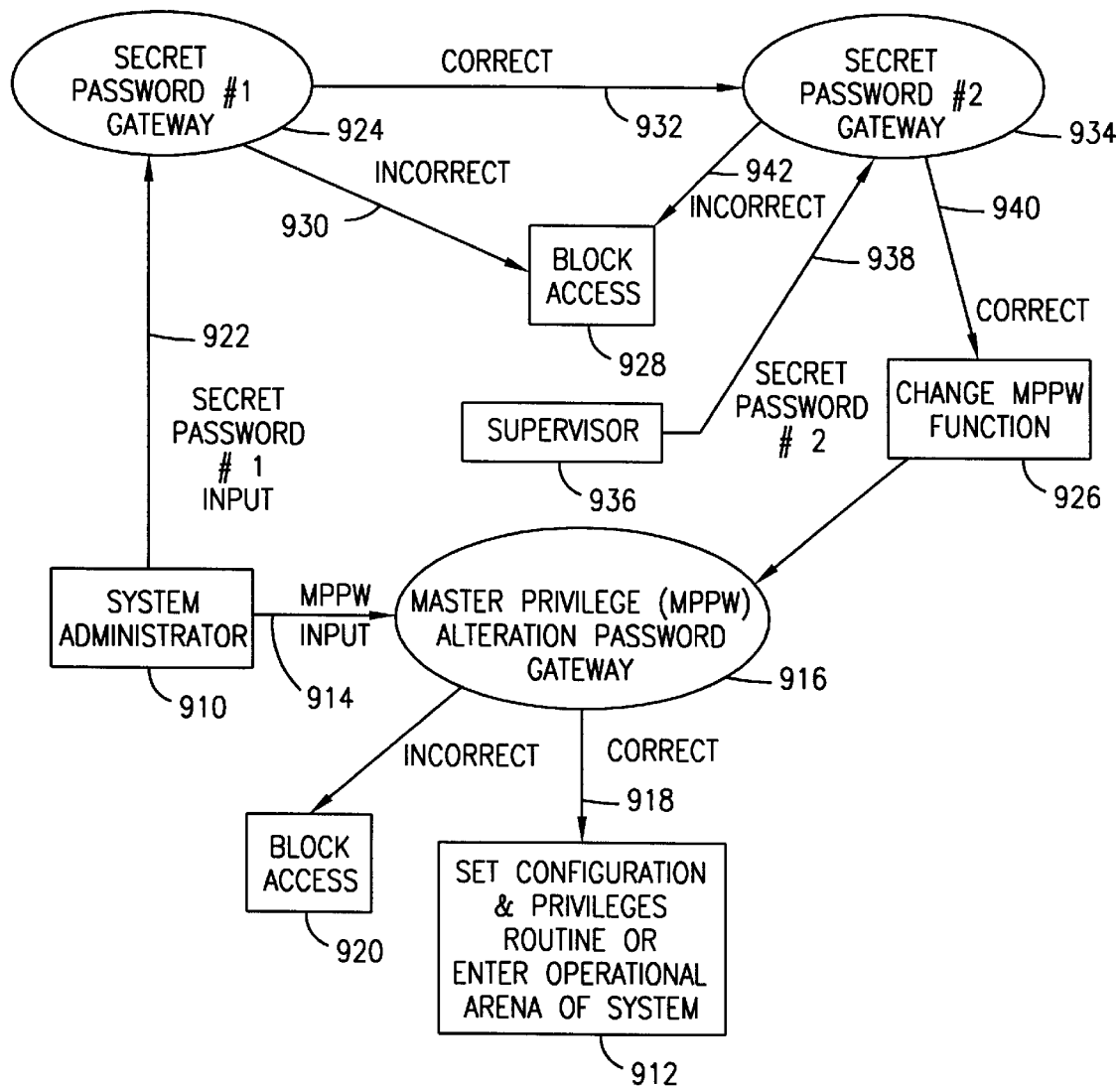
FIG. 12 is a block diagram illustrating an embodiment of the present invention utilizing a dual password security arrangement.

In the preferred embodiment of the dual password security arrangement as symbolized by FIG. 12, two secure passwords and a master password are used. Referring to FIG. 12, a system administrator 910 can have access to some operational functionality 912 of the system he is administering by entering the correct Master Privilege Alteration Password (MPPW), as symbolized by line 914. The MPPW is entered through any user input device and is passed by an operating system (not shown) to a master privilege alteration password gateway function 916. Typically this function will be carried out by a software routine that controls a computer to compare the MPPW entered against a stored MPPW. If there is a match, access is granted to the desired functionality, as symbolized by line 918. In the case of the intelligent Hub and Packet Switching machines described herein, the functionality 912 is a routine to accept user input from the system administrator via paths 914 and 918 through the gateway to alter user privileges, turn ports on or off, or otherwise set or modify the machine configuration. Alternatively, in other contexts, the block 912 can represent the operational arena or main functionality of the system being controlled such as an operating system, financial reporting or accounting system, document or other file in any word processing, spreadsheet, database or other system to be operated, configured or controlled. If the MPPW gateway function 916 finds a mismatch between the MPPW password entered and the previously stored MPPW, access to the functionality 912 is blocked, as symbolized by block 920.

If the system administrator wishes to change the MPPW, two secret password gateways need to be satisfied. The first step in this process requires that system administrator enter a command or select a menu option requesting to change the MPPW. The computer programmed in accordance with the teachings of the invention then responds by asking the system administrator to enter a first secret password. Entry of this secret password #1 is symbolized by path 922. A first secret password gateway function 924 then compares the secret password #1 entered by the system administrator to a stored secret password #1 to which the system adminstrator has no access. If the password entered by the system administrator does not match the stored secret password #1, access to the function 926 to change the MPPW password is blocked, as symbolized by block 928 and path 930. If the password entered by the system administrator matches the stored secret password #1, path 932 is taken to the second secret password gateway functionality 934. The second secret password gateway 934 is a routine which controls the computer to ask for a second secret password which the system administrator 910 does not know and to which he or she has no access. To satisfy this gateway, another user, which for this example will be called the supervisor 936 enters secret password #2, as symbolized by path 938. If this password matches a stored version of secret password #2, then access to the function 926 to change the MPPW password is granted, as symbolized by path 940. If the password received by the second gateway 934 is incorrect, access to the function 926 to change MPPW is blocked, as symbolized by path 942. Thus, the system administrator can change privileges, alter the configuration etc. as long as he knows the MPPW password, but he cannot alter the MPPW without permission from the supervisor or unless he knows both secret passwords #1 and #2.

In alternative embodiments, secret password #2 gateway function 934 can impose a time limit on the time to enter secret password #2 or can impose a maximum limit on the number of incorrect attempts before access is blocked from all further attempts for a prolonged period of time or until the system is reset.

In the genus of packet switching machines, the double password security system described above can be implemented as part of any command and control process. For example, the double password security system can be implemented as part of step 885 in FIG. 10B. Likewise, the double password security system can be implemented as part of any management and control or console process in the genus of embodiments described herein having a hub with an integral bridge such as any of the "network slice" embodiments. For example, the double password security process could be implemented as part of the console command process 282 in FIG. 4.

In some embodiments of the double password security system, the computer which implements said system will have multiple terminals or will be a server computer in a network with multiple satellite computers coupled to said server computer through a hub and local area network segments. In such embodiments, the computer or server computer implementing the double password security system is programmed to assume that when access to shared assets on said computer or server such as shared files, shared programs or shared functions etc. is sought through a particular terminal or a particular satellite computer that a particular user is attempting the access as the computer assumes that particular users always use the same satellite computer or terminal. Each user has his or her own secret password that must be entered properly at a sign on screen to gain access to the shared assets on the computer. Thus, when access is sought through a particular terminal, the computer or server will assume that a particular user is logging on and ask for that user's password. In these embodiments, the function to change the master password can be one of the shared assets. To implement such an embodiment, the central computer or server computer is programmed to implement the two secret password gateways 924 and 934 on two separate satellite computers or terminals. To implement such an embodiment, if user 1 logs in on terminal 1 using the correct log on password for that user and requests to change the master password of the gateway to the system configuration or privileges file, the central computer or server is programmed to request entry of the first secret password on terminal 1 (or satellite computer 1) and request entry of the second secret password on terminal 2 (or satellite computer 2). Thus, a second user has to successfully log on on terminal 2 and then enter the correct second secret password before access to the function to change the master password will be granted. This embodiment provides a third level of password security over the first and second secret password gateways.

Appendix A hereto is the source code for the hub/bridge embodiments of FIGS. 1–6 and 12. This code is intended for the Motorola 68000 microprocessor, but may be ported to other platforms.

Appendix B hereto are the schematic diagrams for the hub/bridge embodiments of FIGS. 1–6 and 12.

Appendix C hereto is the Boolean logic for the programmable gate arrays for the hub/bridge embodiments of FIGS. 1–6 and 12.

Appendix D hereto is the Boolean logic for the field programmable gate array structure in the packet switching embodiments disclosed herein in FIGS. 7–12.

Appendix E, comprised of two portions, is a hexadecimal version of the code that controls the microprocessors in the preferred packet switching embodiment disclosed herein. Part I of Appendix E, comprised of pages 1–29, is the boot code that allows the code of Part II to be read into DRAM 822 in FIG. 8 from nonvolatile flash ROM 805 in FIG. 8 at boot time for execution from DRAM. Part II of Appendix E, comprised of pages 1 through 97, is the portion of the code that does the packet switching function. The main microprocessor 806 in FIG. 8 begins executing the code of Part I and determines therefrom that there is a portion of code from Part II that is intended for execution by the Ethernet processor 804 that needs to be loaded into the shared SRAM 800. The main microprocessor then loads the appropriate portion of the Part II code into SRAM 800 such that the Ethernet processor can start execution. The remaining portion of the Part II code is executed by the main microprocessor out of DRAM 822. Both Parts I and 11 are ported for the Motorola MC68EC040 microprocessor.

Although the invention has been described in terms of the preferred and alternative embodiments disclosed herein, those skilled in the art will appreciate other modifications which may be made without departing from the spirit and scope of the invention. All such modifications and enhancements are intended to be included within the scope of the claims appended hereto.

What is claimed is:

1. An packet switching apparatus, comprising:

a first shared memory having at least first and second ports;

a plurality of media access units, each for coupling to a local area network segment;

a plurality of local area network controller circuits, each coupled to a media access unit, each media access unit for coupling to a network media coupled to one or more machines;

a first microprocessor coupled to said first port and coupled to each said local area network controller circuit by a first bus;

a second microprocessor coupled to said second port by a second bus;

a second memory coupled to said second bus for storing bridging and routing information;

and wherein said first microprocessor is programmed to set up a receive buffer in said first shared memory which is large enough to store data packets received by all said plurality of local area network controller circuits and is programmed to set up in said first shared memory a transmit buffer for each said local area network controller chip, and is programmed to allocate a portion of said first shared memory as a queue for said second microprocessor and a portion of said first shared memory to store descriptor data, said descriptor data having a portion thereof devoted to each said local area network controller circuit, the portion of said descriptor data devoted to each said local area network controller circuit having at least a receive portion, and wherein said local area network controller circuits include means for writing status data to said receive portion which indicates when a packet has been successfully received, and wherein said first microprocessor is programmed to monitor said status data, and when said status data indicates that a packet has been successfully received, for writing a pointer to said packet into said queue for said second microprocessor, and wherein each said packet has addressing information;

and wherein said second microprocessor is programmed to monitor said queue, and when a pointer to a packet is found in said queue, to use said pointer to access said packet and examine the addressing information therein to determine if the packet needs to be bridged or routed for transmission out on a different media that the media on which it arrived using said bridging and routing data stored in said second memory, and if said packet is addressed to a destination machine other than the machine which originated said packet, said second microprocessor is programmed to write a pointer to said packet in the transmit buffer dedicated to the local area network controller coupled by a network segment to the destination machine for said packet.

2. The apparatus of claim 1 wherein said first microprocessor is programmed to allocate a portion of said first shared memory as a free queue for storing data indicating which portions of said receive buffer are available for storing new packets of received data and wherein each said packet includes data comprising a reference count indicating the number of transmit buffers into which a pointer to said packet has been loaded, and wherein said second microprocessor is also programmed to access said packet and determine from the addressing data thereof how many destinations to which the packet is directed, and, if more than one destination address is indicated, said second microprocessor is programmed to write a pointer to said packet into the transmit buffers of all local area network controllers coupled to one of said destination machines defined by the addressing data of said packet and said second microprocessor is further programmed to write said reference count data into said packet indicating the number of transmit buffers into which a pointer to said packet have been written, and wherein the portion of each said descriptor devoted to a specific local ara network controller circuit includes a transmit portion which stores status bits indicating when the local area network controller circuit has transmitted a packet, and wherein each said local area network controller circuit is programmed to access and alter the status bits in said transmit portion of the portion of the descriptor dedicated to that local area controller circuit, said status bit being altered to a status indicating transmission has occurred when a packet having a pointer in the transmit buffer of that local area network controller circuit has been transmitted, and wherein said first microprocessor is programmed to monitor the status bits of the transmit portions of said descriptor to determine when a particular local area network controller circuit has transmitted a packet and to access the reference count of said packet and decrement said reference count, and, if said reference count has reached zero, said first microprocessor is programmed to write a pointer to said packet onto said free queue.

3. The apparatus of claim 2 wherein said second microprocessor is also programmed to implement a console command and control process including a dual password security system for changing the master password needed to alter configuration data and privileges, said second microprocessor programmed to implement said double password security system by receiving a request from a user for access to a function to alter configuration data or set privileges, and, in response thereto, displaying on a display a request for said user to enter a master password, and programmed to compare whatever password is entered by said user to the actual master password, and, only if the user entered the correct master password, for providing said user access to said function to alter said configuration data or said privileges, and programmed to receive a request from said user to alter said master password, and, in response thereto, requesting entry of a first secret password, and programmed to receive whatever password is entered and compare said entered password to said first secret password, and, if said entered password does not match said first secret password, for blocking access to said function of changing said master password, but, if said entered password matches said first secret password, for requesting a second secret password and receiving whatever second password is entered in response to said request and comparing said second entered password to said second secret password, and if said second entered password does not match said second secret password, blocking access to said function to change said master password, and if said second entered password does match said second secret password, for allowing access to said function to change said master password.

4. A packet switching apparatus, comprising:

a shared, multi-port, random access memory having at least first and second ports;

a plurality of media access units for coupling to local area network segments;

a plurality of Local Area Network controller integrated circuits (hereafter LCC) coupled to said media access units and coupled to said first port of said memory, each said LCC for receiving packets from machines coupled to the local area network segments coupled to said media access units and storing them in said memory in a receive buffer, and each said LCC for transmitting via the media access unit coupled to the LCC and the local area network segment coupled to that media access unit any packets having pointers thereto found in a transmit buffer in said main memory assigned to said LCC;

means for establishing in said memory said receive buffer which is large enough to store packets received by all LCC's, and for establishing a transmit buffer for each said LCC and a descriptor ring-having a receive portion and a transmit portion for each said LCC, said receive portion for each LCC for storing status bits indicating when packet reception is complete by that LCC and the packet has been stored in said receive buffer and for placing in a queue in said memory a pointer to the location of said packet in said receive buffer; and means for monitoring said queue, and, when a pointer is found therein, for accessing the packet pointed to by said pointer and determining if said packet needs to be re-transmitted out on a different local area network segment than the packet arrived on, and, if so, for writing a pointer to said packet into the transmit buffer in said memory assigned to the LCC coupled via a media access unit to the local area network segment upon which said packet needs to be transmitted.

5. The process of claim 4 further comprising one or more computers programmed to implement an SNMP management agent, and wherein said first microprocessor is programmed to allocate a portion of said first shared memory as a management queue for use by said SNMP agent, and wherein said second microprocessor is programmed to determine from said addressing information of a packet which said second microprocessor is processing if the packet is addressed to said SNMP agent, and, if so, for moving a pointer to said packet into said management queue.

6. The apparatus of claim 5 wherein said microprocessor programmed to implement said SNMP agent is also programmed to monitor said management queue, and, if a pointer to a packet is found in said management queue, for accessing the packet pointed to by said pointer and executing whatever management command is encoded in said packet, and, if said packet includes a command requiring the SNMP agent to generate a reply, for assembling a reply packet and storing if in said first shared memory and storing a pointer to said packet in the transmit buffer dedicated to the local area network controller circuit coupled to the machine to which said reply packet is addressed.

* * * * *